(12) United States Patent
Kim

(10) Patent No.: US 12,727,029 B2
(45) Date of Patent: Sep. 1, 2026

(54) METHOD AND DEVICE FOR TRANSMITTING/RECEIVING DATA IN COMMUNICATION SYSTEM SUPPORTING MULTI-LINK

(71) Applicants: HYUNDAI MOTOR COMPANY, Seoul (KR); KIA CORPORATION, Seoul (KR); Korea National University of Transportation Industry-Academic Cooperation Foundation, Chungju-si (KR)

(72) Inventor: Yong Ho Kim, Incheon (KR)

(73) Assignees: HYUNDAI MOTOR COMPANY, Seoul (KR); KIA CORPORATION, Seoul (KR); Korea National University of Transportation Industry-Academic Cooperation Foundation, Chungju-si (KR)

( * ) Notice: Subject to any disclaimer, the term of this patent is extended or adjusted under 35 U.S.C. 154(b) by 0 days.

(21) Appl. No.: 18/385,658

(22) Filed: Oct. 31, 2023

(65) Prior Publication Data

US 2024/0064810 A1 Feb. 22, 2024

Related U.S. Application Data

(63) Continuation-in-part of application No. PCT/KR2022/006263, filed on May 2, 2022.

(30) Foreign Application Priority Data

May 6, 2021 (KR) ........................ 10-2021-0058673

(51) Int. Cl.
*H04W 74/0816* (2024.01)

(52) U.S. Cl.
CPC ............................... *H04W 74/0816* (2013.01)

(58) Field of Classification Search
CPC . H04W 74/0816; H04W 76/15; H04W 84/12; H04W 74/002; H04W 74/085; H04L 69/14
See application file for complete search history.

(56) References Cited

U.S. PATENT DOCUMENTS

2003/0152058 A1* 8/2003 Cimini, Jr. ............ H04W 28/18 370/465
2015/0358961 A1* 12/2015 Choi ..................... H04W 72/12 370/336

(Continued)

FOREIGN PATENT DOCUMENTS

| | | | |
|---|---|---|---|
| EP | 3817492 | A1 | 5/2021 |
| KR | 10-2021-0004869 | A | 1/2021 |
| WO | 2021/006545 | A1 | 1/2021 |

OTHER PUBLICATIONS

Y. Seok, et al., "MSDU fragmentation and aggregation in Multi-Link Operation," IEEE 802.11-20/0328r0, Aug. 2, 2020 (see slides 3-9).

*Primary Examiner* — Thomas R Cairns
*Assistant Examiner* — Raenita Ann Fenner
(74) *Attorney, Agent, or Firm* — Morgan, Lewis & Bockius LLP

(57) ABSTRACT

A method and a device for transmitting/receiving data in a communication system supporting a multi-link includes a method of a first device, including the steps of: performing a first back-off operation on a first data frame in a first link; performing a second back-off operation on a second data frame in a second link; transmitting the first data frame to a second device in the first link if the first back-off operation is successful; generating a second data frame part #1 and a second data frame part #2 by performing a fragmentation operation for the second data frame in order to match a transmission completion point of the second data frame with (Continued)

a transmission completion point of the first data frame if the second back-off operation is successful during the transmission of the first data frame; and transmitting the second data frame part #1 to the second device in the second link.

20 Claims, 16 Drawing Sheets

(56) References Cited

U.S. PATENT DOCUMENTS

| | | | | |
|---|---|---|---|---|
| 2016/0173662 | A1* | 6/2016 | Seok | H04L 1/1896 370/252 |
| 2016/0197705 | A1* | 7/2016 | Ryu | H04L 1/1854 370/242 |
| 2017/0164406 | A1* | 6/2017 | Son | H04B 17/318 |
| 2017/0325247 | A1* | 11/2017 | Itagaki | H04L 5/0048 |
| 2020/0045723 | A1* | 2/2020 | Chun | H04W 74/006 |
| 2021/0007168 | A1 | 1/2021 | Asterjadhi et al. | |
| 2021/0014776 | A1 | 1/2021 | Patil et al. | |
| 2021/0076340 | A1* | 3/2021 | Naribole | H04W 74/0808 |
| 2021/0076398 | A1* | 3/2021 | Naribole | H04W 74/0816 |
| 2021/0076412 | A1* | 3/2021 | Naribole | H04W 76/15 |
| 2021/0160347 | A1* | 5/2021 | Chu | H04L 69/14 |
| 2021/0211375 | A1* | 7/2021 | Kwon | H04W 72/535 |
| 2021/0315025 | A1* | 10/2021 | Seok | H04W 74/0808 |

* cited by examiner

Figure 9:
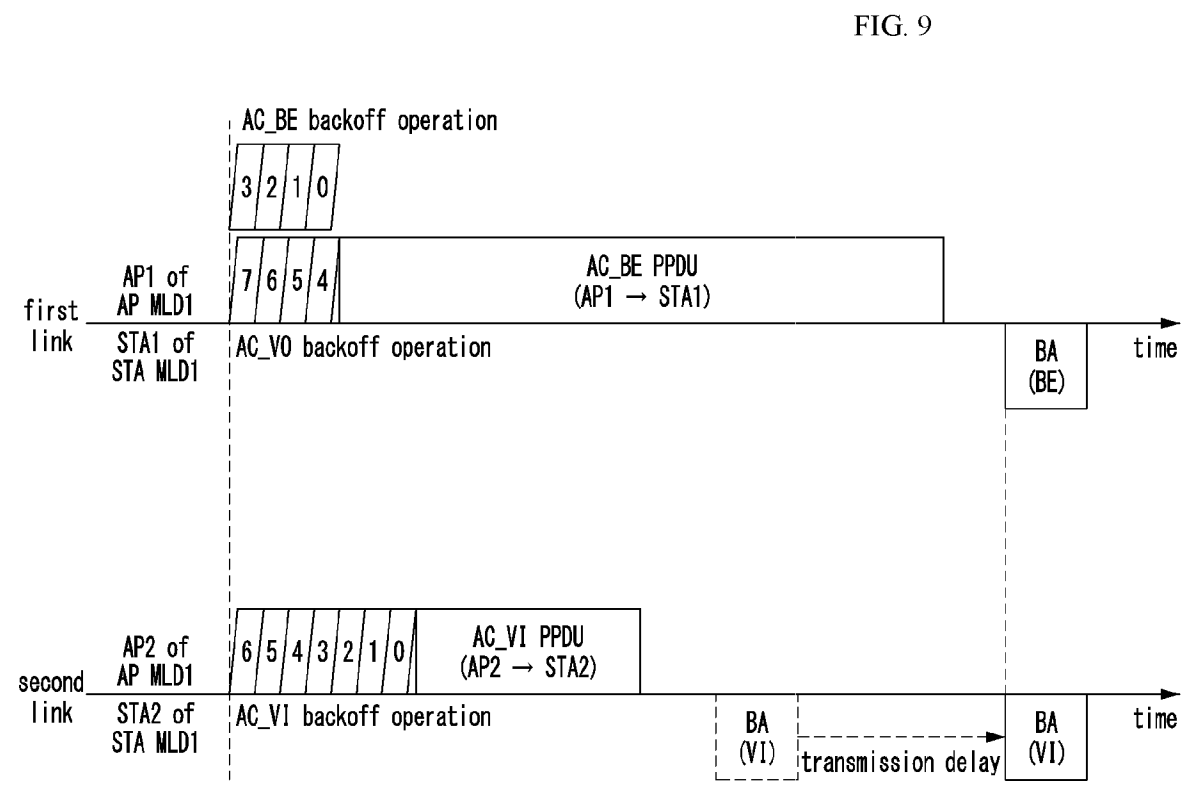

FIG. 9 first link
AP1 of AP MLD1
STA1 of STA MLD1
AC_BE backoff operation
3 2 1 0
7 6 5 4
AC_VO backoff operation
AC_BE PPDU (AP1 → STA1)
BA (BE)
time second link
AP2 of AP MLD1
STA2 of STA MLD1
6 5 4 3 2 1 0
AC_VI backoff operation
AC_VI PPDU (AP2 → STA2)
BA (VI)
transmission delay
BA (VI)
time

Figure 13:
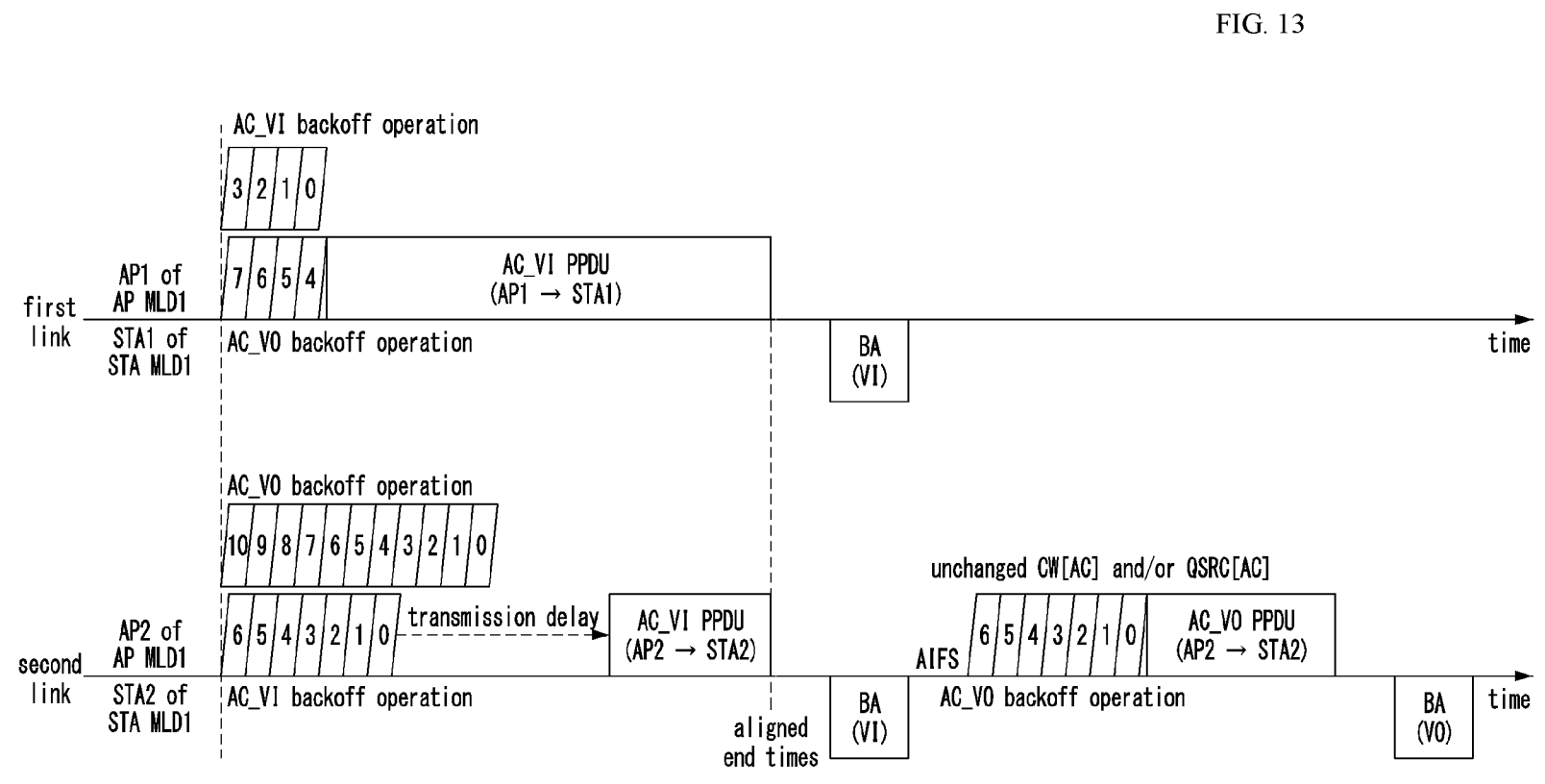

FIG. 13 first link
AP1 of AP MLD1
STA1 of STA MLD1
AC_VI backoff operation
3 2 1 0
7 6 5 4
AC_VI PPDU (AP1 → STA1)
AC_VO backoff operation
BA (VI)
time second link
AP2 of AP MLD1
STA2 of STA MLD1
AC_VO backoff operation
10 9 8 7 6 5 4 3 2 1 0
6 5 4 3 2 1 0
transmission delay
AC_VI backoff operation
AC_VI PPDU (AP2 → STA2)
aligned end times
BA (VI)
unchanged CW[AC] and/or QSRC[AC]
AIFS
6 5 4 3 2 1 0
AC_VO backoff operation
AC_VO PPDU (AP2 → STA2)
BA (VO)
time

METHOD AND DEVICE FOR TRANSMITTING/RECEIVING DATA IN COMMUNICATION SYSTEM SUPPORTING MULTI-LINK

CROSS-REFERENCE TO RELATED APPLICATION

The present application is a continuation-in-part of currently pending International Patent Application No. PCT/KR 2022/006263, filed May 2, 2022, which claims priority to Korean Patent Application No. 10-2021-0058673, filed May 6, 2021, the entire contents of which are incorporated herein for all purposes by these references.

BACKGROUND OF THE PRESENT DISCLOSURE

Field of the Present Disclosure

The present disclosure relates to a wireless local area network (LAN) communication technique, and more particularly, to a technique for data transmission and reception in a device not supporting a simultaneous transmit and receive (STR) operation.

Description of Related Art

Recently, as the spread of mobile devices expands, a wireless local area network technology capable of providing fast wireless communication services to mobile devices is in the spotlight. The wireless LAN technology may be a technology that supports mobile devices such as smart phones, smart pads, laptop computers, portable multimedia players, embedded devices, and the like to wirelessly access the Internet based on wireless communication technology.

The standards using the wireless LAN technology are being standardized as IEEE802.11 standards mainly in the Institute of Electrical and Electronics Engineers (IEEE). As the above-described wireless LAN technologies have been developed and spread, applications using the wireless LAN technologies have been diversified, and a demand for a wireless LAN technology supporting a higher throughput has arisen. Accordingly, a frequency bandwidth (e.g., 'maximum 160 MHz bandwidth' or '80+80 MHz bandwidth') used in the IEEE 802.11ac standard has been expanded, and the number of supported spatial streams has also increased. The IEEE 802.11ac standard may be a very high throughput (VHT) wireless LAN technology supporting a high throughput of 1 gigabit per second (Gbps) or more. The IEEE 802.11ac standard can support downlink transmission for multiple stations by utilizing the MIMO techniques.

As applications requiring higher throughput and applications requiring real-time transmission occur, the IEEE 802.11be standard, which is an extreme high throughput (EHT) wireless LAN technology, is being developed. The goal of the IEEE 802.11be standard may be to support a high throughput of 30 Gbps. The IEEE 802.11be standard may support techniques for reducing a transmission latency. In addition, the IEEE 802.11be standard can support a more expanded frequency bandwidth (e.g., 320 MHz bandwidth), multi-link transmission and aggregation operations including multi-band operations, multiple access point (AP) transmission operations, and/or efficient retransmission operations (e.g., hybrid automatic repeat request (HARQ) operations).

However, since multi-link operations are operations not defined in the existing wireless LAN standard, it may be necessary to define detailed operations according to an environment in which the multi-link operations are performed. In particular, when two or more links are adjacent, simultaneous transmit and receive (STR) operations may not be performed on a multi-link due to interference from adjacent links (e.g., adjacent bands, adjacent channels). If a level of signal interference between adjacent links is above a certain level, a channel sensing operation and/or signal reception operation for transmission on another link may not be performed due to the interference while a transmission operation is performed on one link. In the above-described situation, methods for transmitting and receiving data based on a channel access procedure considering a transmission and reception status of the one link may be required.

Meanwhile, the technologies that are the background of the present disclosure are written to improve the understanding of the background of the present disclosure and may include content that is not already known to those of ordinary skill in the art to which the present disclosure belongs.

BRIEF SUMMARY

The present disclosure is directed to providing a method and an apparatus for data transmission and reception for a device not supporting STR operations in a communication system supporting a multi-link.

A method of a first device, according to various exemplary embodiments of the present disclosure for achieving the above-described objective, may include: performing a first backoff operation for a first data frame on a first link; performing a second backoff operation for a second data frame on a second link; in response that the first backoff operation succeeds, transmitting the first data frame to a second device on the first link; in response that the second backoff operation succeeds during transmission of the first data frame, generating a second data frame part #1 and a second data frame part #2 by performing a fragmentation operation for the second data frame to match a transmission completion time of the second data frame to a transmission completion time of the first data frame; and transmitting the second data frame part #1 to the second device on the second link, wherein the transmission completion time of the first data frame is equal to a transmission completion time of the second data frame part #1.

The method may further include: receiving a first block ACK (BA) frame for the first data frame from the second device on the first link; and receiving a second BA frame for the second data frame part #1 from the second device on the second link, wherein the first BA frame and the second BA frame are received simultaneously.

The method may further include: receiving a first BA frame for the first data frame and a second BA frame for the second data frame part #1 from the second device on one of the first link and the second link.

The method may further include: transmitting the second data frame part #2 to the second device on the second link, without performing a backoff operation after transmission of the second data frame part #1.

A transmit opportunity (TXOP) may be configured on the second link to include a time required for transmission of the second data frame part #1, a time required for reception of a second BA frame for the second data frame part #1, a time required for transmission of the second data frame part #2, and a time required for reception of a third BA frame for the second data frame part #2.

The time required for reception of the second BA frame for the second data frame part #1 may be set to a time corresponding to a maximum length of a BA frame.

The fragmentation operation for the second data frame may be performed when the second device does not support a simultaneous transmit and receive (STR) operation.

The fragmentation operation for the second data frame may be performed when interference occurs between transmission on the first link and transmission on the second link.

A first device, according to various exemplary embodiments of the present disclosure for achieving the above-described objective, may include a processor and a memory configured for storing one or more instructions executable by the processor, and the one or more instructions may be executed to perform: performing a first backoff operation for a first data frame on a first link; performing a second backoff operation for a second data frame on a second link; in response that the first backoff operation succeeds, transmitting the first data frame to a second device on the first link; in response that the second backoff operation succeeds during transmission of the first data frame, generating a second data frame part #1 and a second data frame part #2 by performing a fragmentation operation for the second data frame to match a transmission completion time of the second data frame to a transmission completion time of the first data frame; and transmitting the second data frame part #1 to the second device on the second link, wherein the transmission completion time of the first data frame is equal to a transmission completion time of the second data frame part #1.

The one or more instructions may be executed to perform: receiving a first block ACK (BA) frame for the first data frame from the second device on the first link; and receiving a second BA frame for the second data frame part #1 from the second device on the second link, wherein the first BA frame and the second BA frame are received simultaneously.

The one or more instructions may be executed to perform: receiving a first BA frame for the first data frame and a second BA frame for the second data frame part #1 from the second device on one of the first link and the second link.

The one or more instructions may be executed to perform: transmitting the second data frame part #2 to the second device on the second link, without performing a backoff operation after transmission of the second data frame part #1.

A transmit opportunity (TXOP) may be configured on the second link to include a time required for transmission of the second data frame part #1, a time required for reception of a second BA frame for the second data frame part #1, a time required for transmission of the second data frame part #2, and a time required for reception of a third BA frame for the second data frame part #2.

The time required for reception of the second BA frame for the second data frame part #1 may be set to a time corresponding to a maximum length of a BA frame.

The fragmentation operation for the second data frame may be performed when the second device does not support a simultaneous transmit and receive (STR) operation.

The fragmentation operation for the second data frame may be performed when interference occurs between transmission on the first link and transmission on the second link.

According to an exemplary embodiment of the present disclosure, communication between devices (e.g., stations, access points) may be performed using a multi-link. When some links (e.g., some channels) of the multi-link are adjacent, a simultaneous transmit and receive (STR) operation may not be performed. When a first device performs transmission using a first link and a second link of the multi-link, the first device may perform a transmission operation simultaneously using two links when channel access operations are completed on both the first link and the second link. Therefore, transmission efficiency can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 9 is a timing diagram illustrating various exemplary embodiments of a channel access method for data frame transmission in a wireless LAN system supporting a multi-link.

FIG. 13 is a timing diagram illustrating an eleventh exemplary embodiment of a channel access method for data frame transmission in a wireless LAN system supporting a multi-link.

Figure 1:
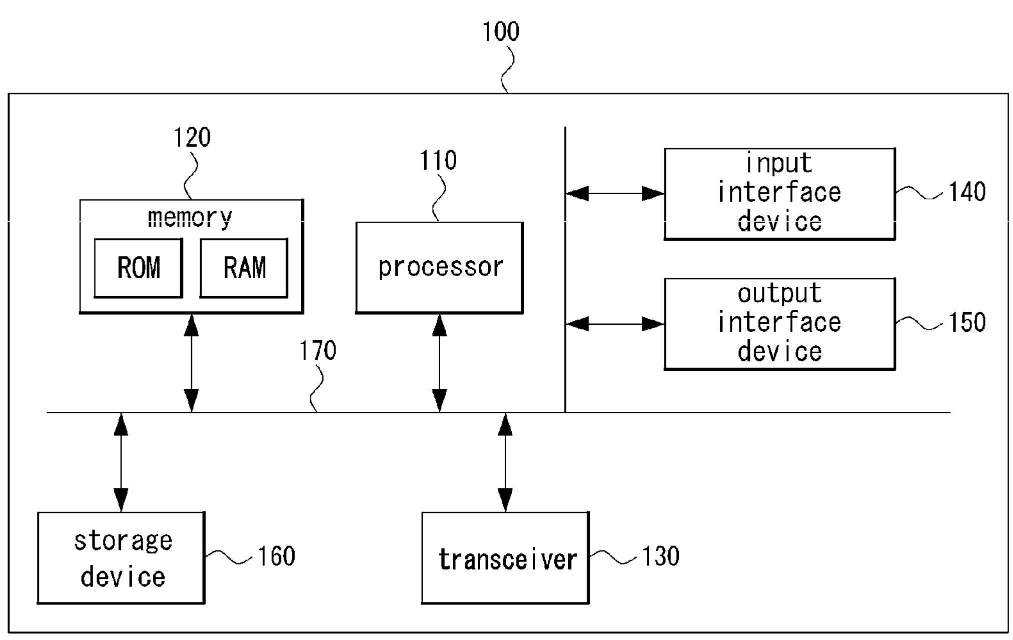
FIG. 1 is a block diagram illustrating various exemplary embodiments of a communication node constituting a wireless LAN system.

It may be understood that the appended drawings are not necessarily to scale, presenting a somewhat simplified representation of various features illustrative of the basic principles of the present disclosure. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the contrary, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the present disclosure, to facilitate the entire understanding of the present disclosure, like numbers refer to like elements throughout the description of the figures and the repetitive description thereof will be omitted.

In the following, a wireless communication system to which exemplary embodiments according to an exemplary embodiment of the present disclosure are applied will be described. The wireless communication system to which the exemplary embodiments according to an exemplary embodiment of the present disclosure are applied is not limited to the contents described below, and the exemplary embodiments according to an exemplary embodiment of the present disclosure can be applied to various wireless communication systems. A wireless communication system may be referred to as a 'wireless communication network'.

FIG. 1 is a block diagram illustrating a first exemplary embodiments of a communication node constituting a wireless LAN system.

As shown in FIG. 1, a communication node 100 may be an access point, a station, an access point (AP) multi-link device (MLD), or a non-AP MLD. An access point may refer to 'AP', and a station may refer to 'STA' or 'non-AP STA'. An operating channel width supported by an AP may be 20 megahertz (MHz), 80 MHz, 160 MHz, or the like. An operating channel width supported by a STA may be 20 MHz, 80 MHz, or the like.

The communication node 100 may include at least one processor 110, a memory 120, and a transceiver 130 connected to a network to perform communications. The transceiver 130 may be referred to as a transceiver, a radio frequency (RF) unit, an RF module, or the like. In addition, the communication node 100 may further include an input interface device 140, an output interface device 150, a storage device 160, and the like. The respective components included in the communication node 100 may be connected by a bus 170 to communicate with each other.

However, the respective components included in the communication node 100 may be connected through individual interfaces or individual buses centering on the processor 110 instead of the common bus 170. For example, the processor 110 may be connected to at least one of the memory 120, the transceiver 130, the input interface device 140, the output interface device 150, and the storage device 160 through a dedicated interface.

The processor 110 may execute program commands stored in at least one of the memory 120 and the storage device 160. The processor 110 may refer to a central processing unit (CPU), a graphics processing unit (GPU), or a dedicated processor on which the methods according to the exemplary embodiments of the present invention are performed. Each of the memory 120 and the storage device 160 may be configured as at least one of a volatile storage medium and a nonvolatile storage medium. For example, the memory 120 may be configured with at least one of a read only memory (ROM) and a random access memory (RAM).

Figure 2:
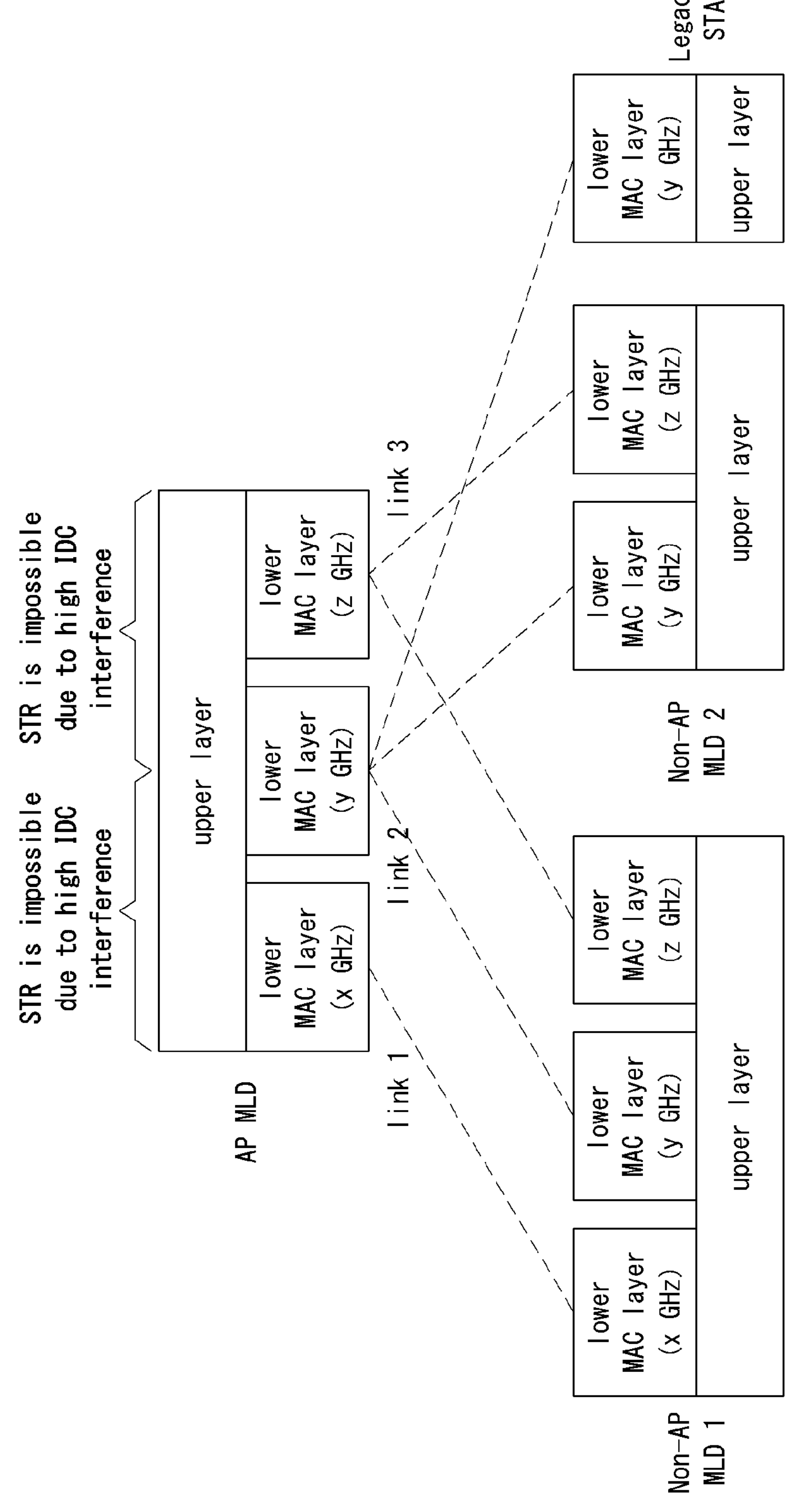
FIG. 2 is a conceptual diagram illustrating various exemplary embodiments of a multi-link configured between multi-link devices (MLDs).

FIG. 2 is a conceptual diagram illustrating a first exemplary embodiment of a multi-link configured between multi-link devices (MLDs).

As shown in FIG. 2, an MLD may have one medium access control (MAC) address. In exemplary embodiments, the MLD may mean an AP MLD and/or non-AP MLD. The MAC address of the MLD may be used in a multi-link setup procedure between the non-AP MLD and the AP MLD. The MAC address of the AP MLD may be different from the MAC address of the non-AP MLD. AP(s) affiliated with the AP MLD may have different MAC addresses, and station(s) affiliated with the non-AP MLD may have different MAC addresses. Each of the APs having different MAC addresses within the AP MLD may be in charge of each link, and may perform a role of an independent AP.

Each of the STAs having different MAC addresses within the non-AP MLD may be in charge of each link, and may perform a role of an independent STA. The non-AP MLD may be referred to as a STA MLD. The MLD may support a simultaneous transmit and receive (STR) operation. In the instant case, the MLD may perform a transmission operation in a link 1 and may perform a reception operation in a link 2. The MLD supporting the STR operation may be referred to as an STR MLD (e.g., STR AP MLD, STR non-AP MLD). In exemplary embodiments, a link may mean a channel or a band. A device that does not support the STR operation may be referred to as a non-STR (NSTR) AP MLD or an NSTR non-AP MLD (or NSTR STA MLD).

The MLD may transmit and receive frames in multiple links by use of a non-contiguous bandwidth extension scheme (e.g., 80 MHz+80 MHz). The multi-link operation may include multi-band transmission. The AP MLD may include a plurality of APs, and the plurality of APs may operate in different links. Each of the plurality of APs may perform function(s) of a lower MAC layer. Each of the plurality of APs may be referred to as a 'communication node' or 'lower entity'. The communication node (i.e., AP) may operate under control of an upper layer (or the processor 110 shown in FIG. 2). The non-AP MLD may include a plurality of STAs, and the plurality of STAs may operate in different links. Each of the plurality of STAs may be referred to as a 'communication node' or 'lower entity'. The communication node (i.e., STA) may operate under control of an upper layer (or the processor 110 shown in FIG. 2).

The MLD may perform communications in multiple bands (i.e., multi-band). For example, the MLD may perform communications using an 80 MHz bandwidth according to a channel expansion scheme (e.g., bandwidth expansion scheme) in a 2.4 GHz band, and perform communications using a 160 MHz bandwidth according to a channel expansion scheme in a 5 GHz band. The MLD may perform communications using a 160 MHz bandwidth in the 5 GHz band, and may perform communications using a 160 MHz bandwidth in a 6 GHz band. One frequency band (e.g., one channel) used by the MLD may be defined as one link. Alternatively, a plurality of links may be configured in one frequency band used by the MLD. For example, the MLD may configure one link in the 2.4 GHz band and two links in the 6 GHz band. The respective links may be referred to as a first link, a second link, and a third link. Alternatively, each link may be referred to as a link 1, a link 2, a link 3, or the like. A link number may be set by an access point, and an identifier (ID) may be assigned to each link.

The MLD (e.g., AP MLD and/or non-AP MLD) may configure a multi-link by performing an access procedure and/or a negotiation procedure for a multi-link operation. In the instant case, the number of links and/or link(s) to be used in the multi-link may be configured. The non-AP MLD (e.g., STA) may identify information on band(s) capable of communicating with the AP MLD. In the negotiation procedure for a multi-link operation between the non-AP MLD and the AP MLD, the non-AP MLD may configure one or more links among links supported by the AP MLD to be used for the multi-link operation. A station that does not support a multi-link operation (e.g., IEEE 802.11a/b/g/n/ac/ax STA) may be connected to one or more links of the multi-link supported by the AP MLD.

When a band separation between multiple links (e.g., a band separation between a link 1 and a link 2 in the frequency domain) is sufficient, the MLD may be able to perform an STR operation. For example, the MLD may transmit a physical layer convergence procedure (PLCP) protocol data unit (PPDU) 1 using the link 1 among multiple links, and may receive a PPDU 2 using the link 2 among multiple links. On the other hand, if the MLD performs an STR operation when the band separation between multiple links is not sufficient, in-device coexistence (IDC) interference, which is interference between the multiple links, may occur. Accordingly, when the bandwidth separation between multiple links is not sufficient, the MLD may not be able to perform an STR operation. A link pair having the above-described interference relationship may be a non-simultaneous transmit and receive (NSTR)-limited link pair. Here, the MLD may be referred to as 'NSTR AP MLD' or 'NSTR non-AP MLD'.

For example, a multi-link including a link 1, a link 2, and a link 3 may be configured between an AP MLD and a non-AP MLD 1. When a band separation between the link 1 and the link 3 is sufficient, the AP MLD may perform an STR operation using the link 1 and the link 3. That is, the AP MLD may transmit a frame using the link 1 and receive a frame using the link 3. When a band separation between the link 1 and the link 2 is insufficient, the AP MLD may not be able to perform an STR operation using the link 1 and the link 2. When a band separation between the link 2 and the link 3 is not sufficient, the AP MLD may not be able to perform an STR operation using the link 2 and the link 3.

Meanwhile, in a wireless LAN system, a negotiation procedure for a multi-link operation may be performed in an access procedure between a station and an access point.

A device (e.g., access point, station) that supports multiple links may be referred to as 'multi-link device (MLD)'. An access point supporting multiple links may be referred to as 'AP MLD', and a station supporting multiple links may be referred to as 'non-AP MLD' or 'STA MLD'. The AP MLD may have a physical address (e.g., MAC address) for each link. The AP MLD may be implemented as if an AP in charge of each link exists separately. A plurality of APs may be managed within one AP MLD. Therefore, coordination between a plurality of APs belonging to the same AP MLD may be possible. A STA MLD may have a physical address (e.g., MAC address) for each link. The STA MLD may be implemented as if a STA in charge of each link exists separately. A plurality of STAs may be managed within one STA MLD. Therefore, coordination between a plurality of STAs belonging to the same STA MLD may be possible.

For example, an AP1 of the AP MLD and a STA1 of the STA MLD may each be responsible for a first link and perform communication using the first link. An AP2 of the AP MLD and a STA2 of the STA MLD may each be responsible for a second link and perform communication using the second link. The STA2 may receive status change information for the first link on the second link. In the instant case, the STA MLD may collect information (e.g., status change information) received on the respective links, and control operations performed by the STA1 based on the collected information.

Hereinafter, data transmission and reception methods in a wireless LAN system will be described. Even when a method (e.g., transmission or reception of a signal) performed at a first communication node among communication nodes is described, a corresponding second communication node may perform a method (e.g., reception or transmission of the signal) corresponding to the method performed at the first communication node. That is, when an operation of a STA is described, an AP corresponding thereto may perform an operation corresponding to the operation of the STA. Conversely, when an operation of an AP is described, a STA corresponding thereto may perform an operation corresponding to the operation of the AP. In exemplary embodiments, an operation of a STA may be interpreted as an operation of a STA MLD, an operation of a STA MLD may be interpreted as an operation of a STA, an operation of an AP may be interpreted as an operation of an AP MLD, and an operation of an AP MLD may be interpreted as an operation of an AP.

Figure 3:
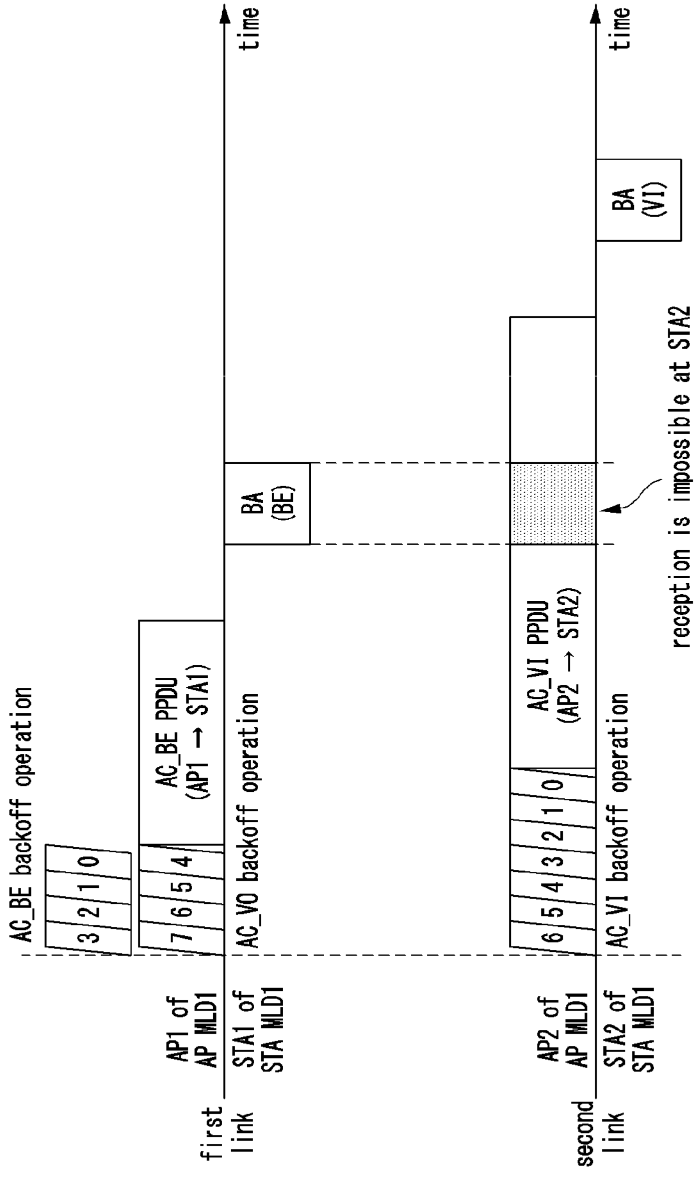
FIG. 3 is a timing diagram illustrating various exemplary embodiments of a channel access method for data frame transmission in a wireless LAN system supporting a multi-link.

FIG. 3 is a timing diagram illustrating a first exemplary embodiment of a channel access method for data frame transmission in a wireless LAN system supporting a multi-link.

As shown in FIG. 3, an AP MLD that supports STR operations may be referred to as 'STR AP MLD', and a non-AP MLD that does not support STR operations may be referred to as 'NSTR non-AP MLD (or NSTR STA MLD)'. An AP MLD1 may be a STR AP MLD, and a STA MLD1 may be an NSTR STA MLD. The AP MLD1 may transmit and receive data frames with the STA MLD1 using a multi-link. An AP1 of the AP MLD1 and a STA1 of the STA MLD1 may operate on a first link, and an AP2 of the AP MLD1 and a STA2 of the STA MLD1 may operate on a second link. Each of the AP1 and the AP2 may perform a backoff operation to transmit a frame on each operating link.

The backoff operation may be an enhanced distributed channel access function (EDCAF). The backoff operation may be performed independently on each of the first link and the second link. The backoff operations on the first link and the second link may be backoff operations for the same access category (AC). Alternatively, the backoff operations on the first link and the second link may be backoff operations for different ACs. A plurality of backoff operations (e.g., a plurality of backoff operations for a plurality of ACs) may be performed on one link. Value(s) of EDCA parameter(s) for backoff operations may be different for each AC. Priorities of ACs may be defined as in Table 1 below, and contention window (CWs) of ACs may be defined as in Table 2 below.

TABLE 1

| Priority | AC | Description |
|---|---|---|
| Lowest | AC_BK | Background |
| Height | AC_BE | Best effort |
| | AC_VI | Video |
| | AC_VO | Voice |

TABLE 2

| AC | CWmin | CWmax |
|---|---|---|
| AC_BK | 31 | 1023 |
| AC_BE | 31 | 1023 |
| AC_VI | 15 | 31 |
| AC_VO | 7 | 15 |

Counter values for the backoff operations on the first link and the second link may be selected independently. The counter value may mean a backoff counter value. The backoff operation may succeed first on one link (e.g., first link) among the first link and the second link. For example, a backoff operation may succeed first on a link (e.g., first link) for which a small backoff counter value is selected. A plurality of backoff operations for a plurality of AC data units may be performed simultaneously. Among the plurality of backoff operations, a backoff operation whose counter value reaches 0 first may be determined to be successful. When the backoff operation is successful on the first link (e.g., when the backoff counter value of the backoff operation becomes 0), the AP1 of AP the MLD1 may transmit, on the first link, a frame (e.g., data frame) including an AC data unit (e.g., AC_BE data unit, AC_BE MAC protocol data unit (MPDU), AC_BE PPDU) associated with the corresponding backoff operation at a boundary of a slot in which the counter value becomes 0. The AC data unit may refer to an AC BK data unit, AC_BE data unit, AC_VI data unit, or AC_VO data unit. The data unit may refer to a PPDU and/or MPDU. A frame including the AC data unit may refer to an AC frame (e.g., AC BK frame, AC_BE frame, AC_VI frame, AC_VO frame).

The backoff operation may succeed on the second link while the data frame is transmitted on the first link. In the instant case, the AP2 of the AP MLD1 may transmit, on the second link, a frame (e.g., data frame) including an AC data unit (e.g., AC_VI data unit, AC_VI PPDU, AC_VI MPDU) associated with the corresponding backoff operation at a boundary of a slot in which the counter value becomes 0. The data frames on the first link and the second link may be transmitted to the same STA MLD (e.g., STA MLD1). The STA MLD1 may be an NSTR STA MLD that does not support STR operations.

The STA MLD1 may receive the data frames on the multi-link (e.g., first link and second link). When reception of a data frame is completed on one (e.g., first link) of the multi-link, the STA1 of the STA MLD1 may transmit a block acknowledgement (BA) frame (e.g., acknowledgement (ACK) frame) on the first link after a short interframe space (SIFS) elapses from a reception completion time of the data frame. In the instant case, the transmission operation of the BA frame on the first link and the reception operation of the data frame on the second link may be performed simultaneously. However, the STA MLD1 cannot perform an STR operation because it is an NSTR STA MLD. Therefore, while the BA frame is transmitted on the first link, the STA2 may not receive the data frame on the second link. A period in which the reception operation cannot be performed on the second link while the transmission operation is performed on the first link may be referred to as a blindness period. The STA2 may not receive a part of the data frame during the blindness period. In the instant case, a result of an error check (e.g., cyclic redundancy check (CRC)) on the data frame, which is performed in the STA2, may be a failure (e.g., error occurs).

Figure 4:
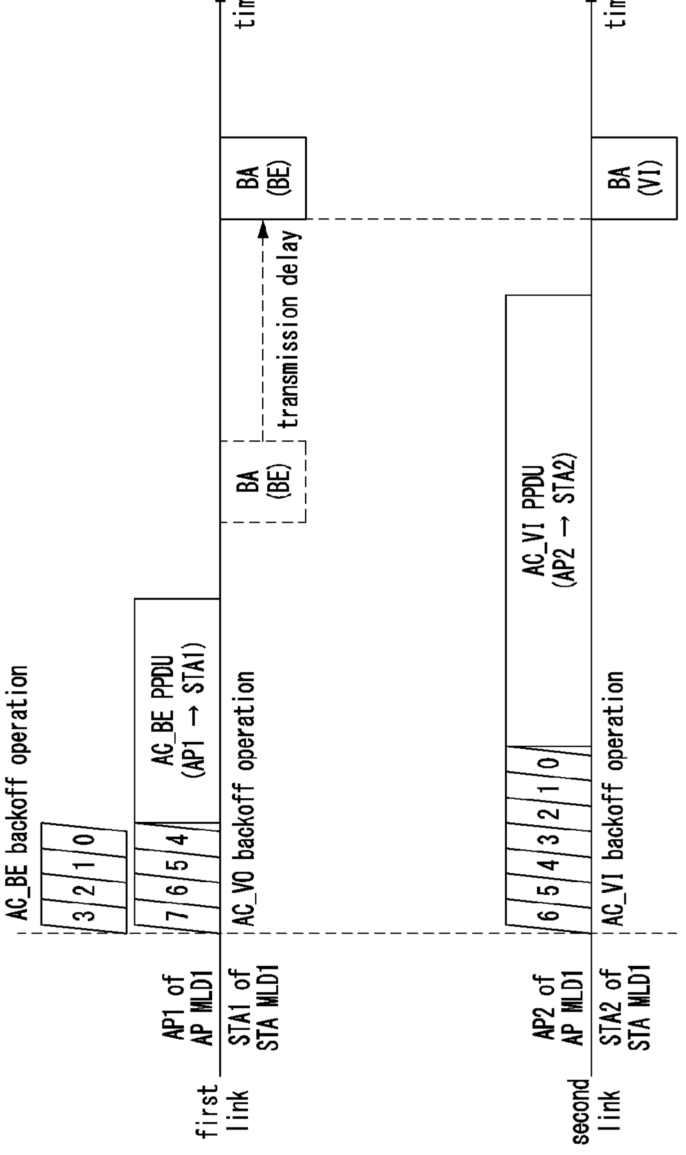
FIG. 4 is a timing diagram illustrating various exemplary embodiments of a channel access method for data frame transmission in a wireless LAN system supporting a multi-link.

FIG. 4 is a timing diagram illustrating a second exemplary embodiment of a channel access method for data frame transmission in a wireless LAN system supporting a multi-link.

As shown in FIG. 4, an AP MLD that supports STR operations may be referred to as 'STR AP MLD', and a non-AP MLD that does not support STR operations may be referred to as 'NSTR non-AP MLD (or NSTR STA MLD)'. An AP MLD1 may be a STR AP MLD, and a STA MLD1 may be an NSTR STA MLD. The AP MLD1 may transmit and receive data frames with the STA MLD1 using a multi-link. An AP1 of the AP MLD1 and a STA1 of the STA MLD1 may operate on a first link, and an AP2 of the AP MLD1 and a STA2 of the STA MLD1 may operate on a second link. Each of the AP1 and the AP2 may perform a backoff operation to transmit a frame on each operating link.

The backoff operation may be an EDCAF. The backoff operation may be performed independently on each of the first link and the second link. The backoff operations on the first link and the second link may be backoff operations for the same AC. Alternatively, the backoff operations on the first link and the second link may be backoff operations for different ACs. A plurality of backoff operations (e.g., a plurality of backoff operations for a plurality of ACs) may be performed on one link. Value(s) of EDCA parameter(s) for backoff operations may be different for each AC.

The backoff operation may succeed first on one link (e.g., first link) of the first link and the second link. For example, the backoff operation may succeed first on a link (e.g., first link) for which a small backoff counter value is selected. A plurality of backoff operations for a plurality of AC data units may be performed simultaneously. Among the plurality of backoff operations, a backoff operation whose counter value reaches 0 first may be determined to be successful. When the backoff operation is successful on the first link (e.g., when the backoff counter value of the backoff operation becomes 0), the AP1 of AP the MLD1 may transmit, on the first link, a frame (e.g., data frame) including an AC data unit (e.g., AC_BE data unit, AC_BE PPDU, AC_BE MPDU) associated with the corresponding backoff operation at a boundary of a slot in which the counter value becomes 0.

The backoff operation may succeed on the second link while the data frame is transmitted on the first link. In the instant case, the AP2 of the AP MLD1 may transmit, on the second link, a frame (e.g., data frame) including an AC data unit (e.g., AC_VI data unit, AC_VI PPDU, AC_VI MPDU) associated with the corresponding backoff operation at a boundary of a slot in which the counter value becomes 0. The data frames on the first link and the second link may be transmitted to the same STA MLD (e.g., STA MLD1). The STA MLD1 may be an NSTR STA MLD that does not support STR operations.

The STA MLD1 may receive the data frames on the multi-link (e.g., first link and second link). When reception of a data frame is completed on one link (e.g., first link) of the multi-link, the STA MLD1 may identify whether reception of a data frame is in progress on another link (e.g., second link). When the data frame reception operation is in progress on the second link, the STA1 of the STA MLD1 may wait for transmission of a BA frame for the AC_BE PPDU until a transmission time of a BA frame for the AC_VI PPDU on the second link. The STA MLD1 may transmit the BA frames simultaneously on the first link and the second link. That is, the transmission of the BA frame on the first link may be delayed after reception of the data frame on the second link.

The AP1 may configure a transmit opportunity (TXOP) on the first link to (a time required for transmission of the data frame+SIFS+a time required for reception of the BA frame). For example, the AP1 may set a duration field in a MAC header of an MPDU included in the data frame to (a time required for transmission of the data frame+SIFS+a time required for reception of the BA frame). The transmission of the BA frame on the first link may be delayed, and in the instant case, the transmission of the BA frame may be performed after the TXOP configured by the AP1. Therefore, the STA1 may transmit the BA frame after performing a backoff operation. When the backoff operation for the BA frame on the first link is successful before transmission of the BA frame on the second link, the STA MLD1 may transmit the BA frames on the first link and the second link simultaneously. That is, the transmissions of the BA frames on the first link and the second link may be synchronized transmissions. When the backoff operation for the BA frame on the first link is not successful before transmission of the BA frame on the second link, the STA MLD1 may transmit the BA frame after the backoff operation on the first link is completed.

Figure 5:
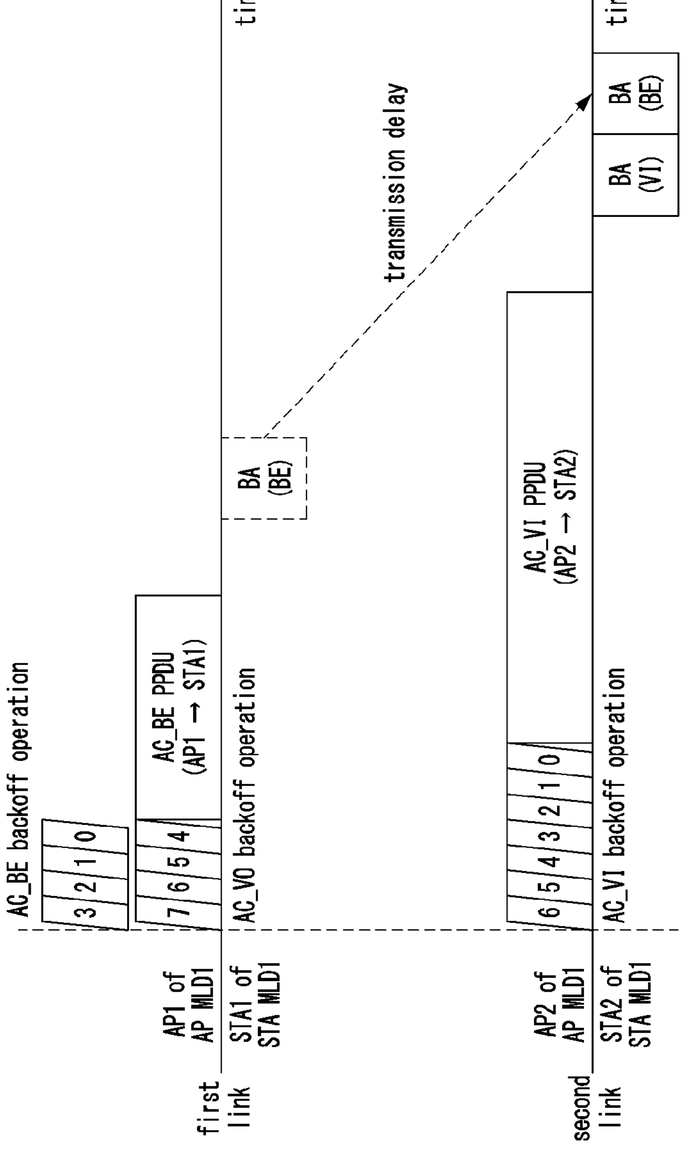
FIG. 5 is a timing diagram illustrating various exemplary embodiments of a channel access method for data frame transmission in a wireless LAN system supporting a multi-link.

FIG. 5 is a timing diagram illustrating a third exemplary embodiment of a channel access method for data frame transmission in a wireless LAN system supporting a multi-link.

As shown in FIG. 5, an AP MLD that supports STR operations may be referred to as 'STR AP MLD', and a non-AP MLD that does not support STR operations may be referred to as 'NSTR non-AP MLD (or NSTR STA MLD)'. An AP MLD1 may be a STR AP MLD, and a STA MLD1 may be an NSTR STA MLD. The AP MLD1 may transmit and receive data frames with the STA MLD1 using a multi-link. An AP1 of the AP MLD1 and a STA1 of the STA MLD1 may operate on a first link, and an AP2 of the AP MLD1 and a STA2 of the STA MLD1 may operate on a second link. Each of the AP1 and the AP2 may perform a backoff operation to transmit a frame on each operating link.

The backoff operation may be an EDCAF. The backoff operation may be performed independently on each of the first link and the second link. The backoff operations on the first link and the second link may be backoff operations for the same AC. Alternatively, the backoff operations on the first link and the second link may be backoff operations for different ACs. A plurality of backoff operations (e.g., a plurality of backoff operations for a plurality of ACs) may be performed on one link. Value(s) of EDCA parameter(s) for backoff operations may be different for each AC.

The backoff operation may succeed first on one link (e.g., first link) of the first link and the second link. For example, the backoff operation may succeed first on a link (e.g., first link) for which a small backoff counter value is selected. A plurality of backoff operations for a plurality of AC data units may be performed simultaneously. Among the plurality of backoff operations, a backoff operation whose counter value reaches 0 first may be determined to be successful. When the backoff operation is successful on the first link (e.g., when the backoff counter value of the backoff operation becomes 0), the AP1 of AP the MLD1 may transmit, on the first link, a frame (e.g., data frame) including an AC data unit (e.g., AC_BE data unit, AC_BE PPDU, AC_BE MPDU) associated with the corresponding backoff operation at a boundary of a slot in which the counter value becomes 0.

The backoff operation may succeed on the second link while the data frame is transmitted on the first link. In the instant case, the AP2 of the AP MLD1 may transmit, on the second link, a frame (e.g., data frame) including an AC data unit (e.g., AC_VI data unit, AC_VI PPDU, AC_VI MPDU) associated with the corresponding backoff operation at a boundary of a slot in which the counter value becomes 0. The data frames on the first link and the second link may be transmitted to the same STA MLD (e.g., STA MLD1). The STA MLD1 may be an NSTR STA MLD that does not support STR operations.

The STA MLD1 may receive the data frames on the multi-link (e.g., first link and second link). When reception of a data frame is completed on one link (e.g., first link) of the multi-link, the STA MLD1 may identify whether reception of a data frame is in progress on another link (e.g., second link). When the data frame reception operation is in progress on the second link, the STA1 of the STA MLD1 may not transmit a BA frame for the AC_BE PPDU. When reception of the data frame is completed on the second link, the STA2 may transmit a BA frame (hereinafter referred to as 'second BA frame') for the AC_VI PPDU on the second link and a BA frame for the AC_BE PPDU (hereinafter referred to as 'first BA frame') on the first link after a SIFS elapses from a reception completion time of the data frame on the second link. That is, the second BA frame and the first BA frame may be transmitted together on the second link.

The second BA frame and the first BA frame may be configured in a form of an aggregated (A)-MPDU. Alternatively, the second BA frame and the first BA frame may be transmitted on the second link with an interval of an SIFS. Alternatively, an ACK bitmap may be extended. For example, one BA frame transmitted on the second link may include reception status information (e.g., ACK/NACK information) for the AC_VI PPDU received on the second link and reception status information (e.g., ACK/NACK information) for the AC_BE PPDU received on the first link. The TXOP for transmission of the AC_VI PPDU on the second link may be configured considering a time required for transmission of the first BA frame. That is, the TXOP may be configured to be (a time required for transmission of the AC_VI data frame+SIFS+a time required for transmission of the second BA frame+a time required for transmission of the first BA frame) or (a time required for transmission of the AC_VI data frame+SIFS+a time required for transmission of the second BA frame+SIFS+a time required for transmission of the first BA frame). For example, the AP2 may set a duration field in a MAC header of an MPDU included in the data frame to (a time required for transmission of the AC_VI data frame+SIFS+a time required for transmission of the second BA frame+a time required for transmission of the first BA frame) or (a time required for transmission of the AC_VI data frame+SIFS+a time required for transmission of the second BA frame+SIFS+a time required for transmission of the first BA frame).

Figure 6:
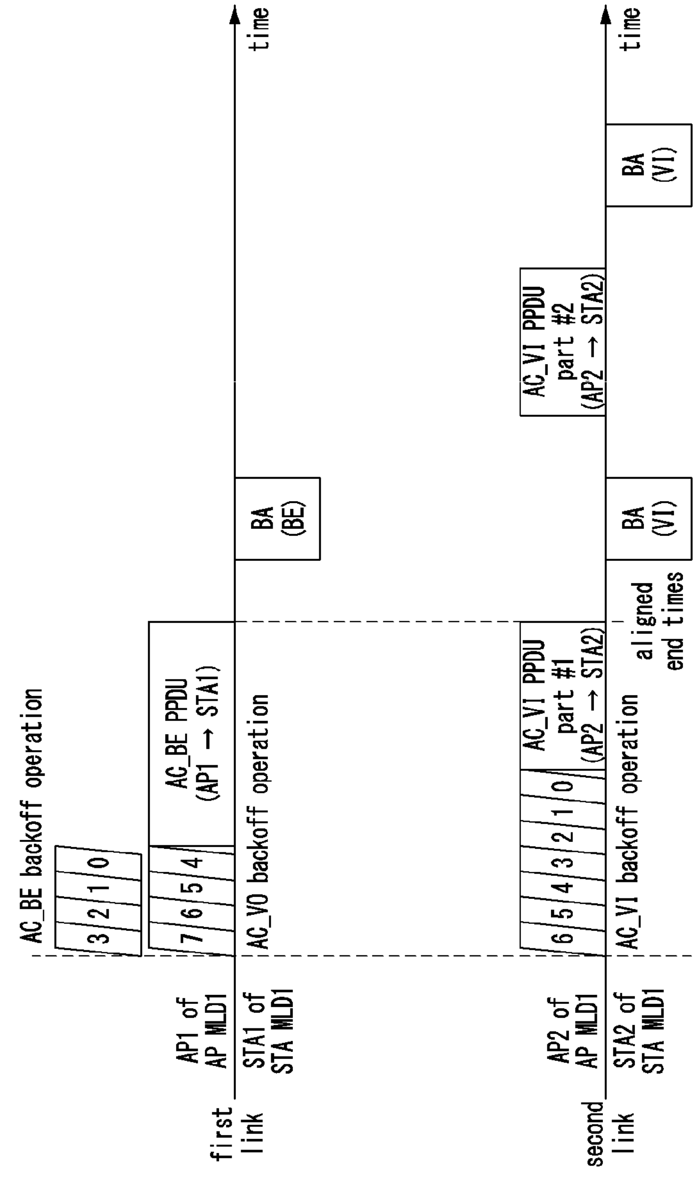
FIG. 6 is a timing diagram illustrating various exemplary embodiments of a channel access method for data frame transmission in a wireless LAN system supporting a multi-link.

FIG. 6 is a timing diagram illustrating a fourth exemplary embodiment of a channel access method for data frame transmission in a wireless LAN system supporting a multi-link.

As shown in FIG. 6, an AP MLD that supports STR operations may be referred to as 'STR AP MLD', and a non-AP MLD that does not support STR operations may be referred to as 'NSTR non-AP MLD (or NSTR STA MLD)'. An AP MLD1 may be a STR AP MLD, and a STA MLD1 may be an NSTR STA MLD. The AP MLD1 may transmit and receive data frames with the STA MLD1 using a multi-link. An AP1 of the AP MLD1 and a STA1 of the STA MLD1 may operate on a first link, and an AP2 of the AP MLD1 and a STA2 of the STA MLD1 may operate on a second link. Each of the AP1 and the AP2 may perform a backoff operation to transmit a frame on each operating link.

The backoff operation may be an EDCAF. The backoff operation may be performed independently on each of the first link and the second link. The backoff operations on the first link and the second link may be backoff operations for the same AC. Alternatively, the backoff operations on the first link and the second link may be backoff operations for different ACs. A plurality of backoff operations (e.g., a plurality of backoff operations for a plurality of ACs) may be performed on one link. Value(s) of EDCA parameter(s) for backoff operations may be different for each AC.

The backoff operation may succeed first on one (e.g., first link) of the first link and the second link. For example, the backoff operation may succeed first on a link (e.g., first link) for which a small backoff counter value is selected. A plurality of backoff operations for a plurality of AC data units may be performed simultaneously. Among the plurality of backoff operations, a backoff operation whose counter value reaches 0 first may be determined to be successful. When the backoff operation is successful on the first link (e.g., when the backoff counter value of the backoff operation becomes 0), the AP1 of AP the MLD1 may transmit, on the first link, a frame (e.g., data frame) including an AC data unit (e.g., AC_BE data unit, AC_BE PPDU, AC_BE MPDU) associated with the corresponding backoff operation at a boundary of a slot in which the counter value becomes 0.

The backoff operation may succeed on the second link while the data frame is transmitted on the first link. In the instant case, the AP2 of the AP MLD1 may transmit, on the second link, a frame (e.g., data frame) including an AC data unit (e.g., AC_VI data unit, AC_VI PPDU, AC_VI MPDU) associated with the corresponding backoff operation at a boundary of a slot in which the counter value becomes 0. The data frames on the first link and the second link may be transmitted to the same STA MLD (e.g., STA MLD1). The STA MLD1 may be an NSTR STA MLD that does not support STR operations.

A transmission completion time of the data frame (e.g., AC_VI frame) on the link (e.g., second link) where transmission of the corresponding data frame started later may be after a transmission completion time of the data frame (e.g., AC_BE frame) on the link (e.g., first link) where transmission of the corresponding data frame started earlier. In the instant case, in order to ensure the same transmission completion time of the data frames on the multi-link (e.g., first link and second link), the data frame with the later transmission completion time may be fragmented. A fragmentation operation may be performed when the STA MLD1 receiving the data frames does not support STR operations (e.g., when the STA MLD1 is an NSTR STA MLD), when the transmission operation on the second link causes interference with the reception operation on the first link, and/or when the transmission operation on the first link causes interference with the reception operation on the second link.

For example, in order to match the transmission completion time of the AC_VI frame on the second link to the transmission completion time of the AC_BE frame on the first link, the AC_VI frame on the second link may be fragmented into an AC_VI frame part #1 (e.g., AC_VI PPDU part #1) and an AC_VI frame part #2 (e.g., AC_VI PPDU part #2). The AP2 of the AP MLD1 may perform the fragmentation so that the length of the AC_VI frame part #1 (e.g., AC_VI PPDU part #1) to be transmitted on the second link is matched to the transmission completion time of the AC_BE PPDU on the first link. The AC_VI frame part #1 and the AC_VI frame part #2 may each include a sequence number (SN) for the fragmented data unit. The SN may be used for reassembly of the fragmented data units in the reception procedure.

The AP2 may transmit the AC_VI frame part #1 when the backoff operation is successful on the second link. The transmission completion time of the AC_VI frame part #1 on the second link may be the same as the transmission completion time of the AC_BE frame on the first link. The STA MLD1 may receive the AC_BE frame on the first link and receive the AC_VI frame part #1 on the second link. In the instant case, the STA MLD1 may transmit BA frames for the corresponding data frames on the first link and the second link, respectively. The BA frames may be transmitted after a SIFS elapses from the transmission completion time of the data frames. The BA frames may be transmitted and received simultaneously on the first link and the second link. The lengths of the BA frames to be transmitted on the first link and the second link may be different. When the length of the BA frame to be transmitted and received on the second link is longer than or equal to the length of the BA frame to be transmitted and received on the first link, the AP MLD1 may transmit the data frame (e.g., AC_VI frame part #2) on the second link after a SIFS elapses from a reception time of the BA frame after the BA frames are transmitted and received simultaneously.

When the STA2 of the STA MLD1 starts receiving the data frame on the second link while the STA1 of the STA MLD1 is receiving the data frame on the first link, the STA2 of the STA MLD1 may identify a TXOP configured by the AP2 of the AP MLD through a duration field in a MAC header of the data frame (e.g., MPDU) of the second link. If a time configured by the duration field is sufficient for the transmission operation of the BA frame and a reception operation of an additional data frame (e.g., when the AP2 of the AP MLD1 configures the TXOP to include a time required for transmitting the AC_VI frame part #2), the STA MLD1 may set the lengths of the BA frames to be the same so that the transmissions of the BA frames on the first link and the second link end at the same time, and transmit the BA frames with the same lengths on the first link and the second link. After receiving the data frames on the first link and the second link, the STA MLD1 may configure contents of the BA frames to be transmitted on the respective links according to reception statuses of the data frames (e.g., error statuses of MPDUs). The length of the BA frame may vary depending on the contents of the BA frame. The STA1 and STA2 of the STA MLD1 may share information on the lengths of the BA frames to be transmitted, and based on the shared information, add padding bit(s) to a shorter BA frame according to the length of a longer BA frame among the two BA frames, so that the lengths of the two BA frames are equal to each other. When the length of the BA frame to be transmitted on the first link is shorter than the length of the BA frame to be transmitted on the second link, the STA MLD1 may transmit the corresponding BA frames without configuring the lengths of the BA frames to be the same.

When the STA2 of the STA MLD1 starts receiving the data frame on the second link while the STA1 of the STA MLD1 is receiving the data frame on the first link, the STA2 of the STA MLD1 may identify a TXOP configured by the AP2 of the AP MLD through a duration field in a MAC header of the data frame (e.g., MPDU) of the second link. If a time configured by the duration field is sufficient for the transmission operation of the BA frame and a reception operation of an additional data frame (e.g., when the AP2 of the AP MLD1 configures the TXOP to include a time required for transmitting the AC_VI frame part #2), the STA2 of the STA MLD1 may set the length of the BA frame transmitted on the second link to be equal to or greater than the length of the BA frame transmitted on the first link. For the above-described configuration, the STA2 of the STA MLD1 may add padding bit(s) to the BA frame transmitted on the second link. Alternatively, if the time configured by the duration field as described above is sufficient for the transmission operation of the BA frame and the reception operation of the additional data frame, the STA2 of the STA MLD1 may set the length of the BA frame transmitted on the second link to the maximum length regardless of the length of the BA frame to be transmitted on the first link, and transmit the BA frame with the maximum length on the second link.

Since the data frame (e.g., AC_VI frame part #2) to be transmitted on the second link remains, the AP2 may transmit the AC_VI frame part #2 on the second link after a SIFS elapses from a reception completion time of the BA frame for the AC_VI frame part #1. The AC_VI frame part #2 may be transmitted without performing a backoff operation. The STA2 may receive the AC_VI frame part #2 on the second link, and may transmit a BA frame after a SIFS elapses from a reception completion time of the AC_VI frame part #2. The AP MLD1 (e.g., AP2) may configure a TXOP on the second link in consideration of (a time required for transmission of the AC_VI frame part #1+SIFS+a time required for reception of a BA frame for the AC_VI frame part #1+SIFS+a time required for transmission of the AC_VI frame part #2+SIFS+a time required for reception of a BA frame for the AC_VI frame part #2). That is, the TXOP may be including (a time required for transmission time of the AC_VI frame part #1+SIFS+a time required for reception of a BA frame for the AC_VI frame part #1+SIFS+a time required for transmission of the AC_VI frame part #2+SIFS+a time required for reception of a BA frame for the AC_VI frame part #2). For example, the AP2 of the AP MLD1 may set a duration field in a MAC header of an MPDU included in the AC_VI PPDU part #1 on the second link to (a time required for transmission time of the AC_VI frame part #1+SIFS+a time required for reception of a BA frame for the AC_VI frame part #1+SIFS+a time required for transmission of the AC_VI frame part #2+SIFS+a time required for reception of a BA frame for the AC_VI frame part #2). The lengths of the BA frames to be transmitted by the STA MLD1 may vary depending on a reception status of the AC_BE frame received on the first link and a reception status of the AC_VI frame part #1 received on the second link. The AP2 of the AP MLD1 may configure a TXOP considering a time required for reception of the BA frame for the AC_VI frame part #1 as the maximum length.

Alternatively, the AP2 may independently configure a TXOP #1 for transmission of the AC_VI frame part #1 and a TXOP #2 for transmission of the AC_VI frame part #2 on the second link. The TXOP #1 may be configure to include (a time required for transmission of the AC_VI frame part #1+SIFS+a time required for reception of a BA frame for the AC_VI frame part #1), and the TXOP #2 may be configured to include (a time required for transmission of the AC_VI frame part #2+SIFS+a time required for reception of a BA frame for the AC_VI frame part #2). For example, the AP2 of the AP MLD1 may set a duration field in a MAC header of an MPDU included in the AC_VI PPDU part #1 on the second link to a time including (a time required for transmission of the AC_VI frame part #1+SIFS+a time required for reception of a BA frame for the AC_VI frame part #1), and set a duration field in a MAC header of an MPDU included in the AC_VI PPDU part #2 to a time including (a time required for transmission of the AC_VI frame part #2+SIFS+a time required for reception of a BA frame for the AC_VI frame part #2).

Figure 7:
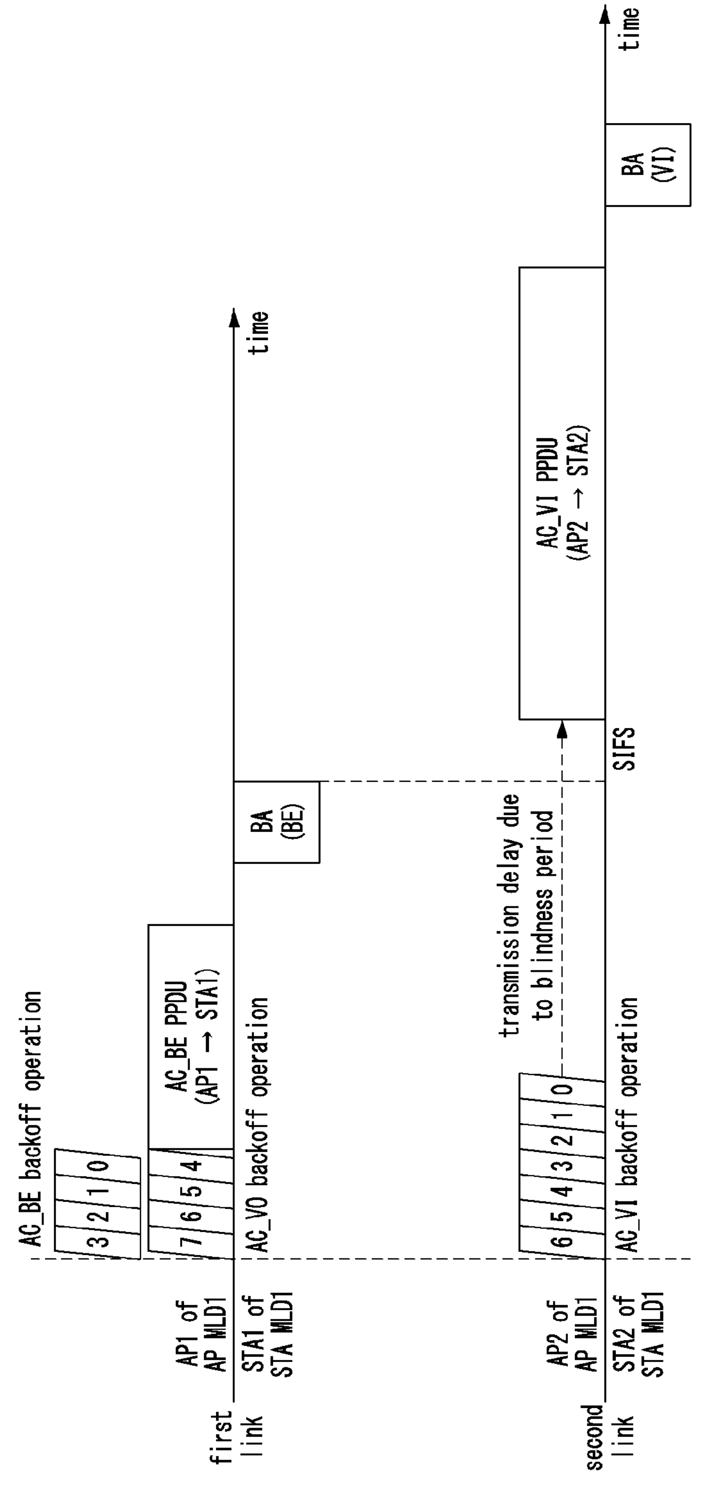
FIG. 7 is a timing diagram illustrating various exemplary embodiments of a channel access method for data frame transmission in a wireless LAN system supporting a multi-link.

FIG. 7 is a timing diagram illustrating a fifth exemplary embodiment of a channel access method for data frame transmission in a wireless LAN system supporting a multi-link.

As shown in FIG. 7, an AP MLD that supports STR operations may be referred to as 'STR AP MLD', and a non-AP MLD that does not support STR operations may be referred to as 'NSTR non-AP MLD (or NSTR STA MLD)'. An AP MLD1 may be a STR AP MLD, and a STA MLD1 may be an NSTR STA MLD. The AP MLD1 may transmit and receive data frames with the STA MLD1 using a multi-link. An AP1 of the AP MLD1 and a STA1 of the STA MLD1 may operate on a first link, and an AP2 of the AP MLD1 and a STA2 of the STA MLD1 may operate on a second link. Each of the AP1 and the AP2 may perform a backoff operation to transmit a frame on each operating link.

The backoff operation may be an EDCAF. The backoff operation may be performed independently on each of the first link and the second link. The backoff operations on the first link and the second link may be backoff operations for the same AC. Alternatively, the backoff operations on the first link and the second link may be backoff operations for different ACs. A plurality of backoff operations (e.g., a plurality of backoff operations for a plurality of ACs) may be performed on one link. Value(s) of EDCA parameter(s) for backoff operations may be different for each AC.

The backoff operation may succeed first on one (e.g., first link) of the first link and the second link. For example, the backoff operation may succeed first on a link (e.g., first link) for which a small backoff counter value is selected. A plurality of backoff operations for a plurality of AC data units may be performed simultaneously. Among the plurality of backoff operations, a backoff operation whose counter value reaches 0 first may be determined to be successful. When the backoff operation is successful on the first link (e.g., when the backoff counter value of the backoff operation becomes 0), the AP MLD1 may transmit, on the first link, a frame (e.g., data frame) including an AC data unit (e.g., AC_BE data unit, AC_BE PPDU, AC_BE MPDU) associated with the corresponding backoff operation at a boundary of a slot in which the counter value becomes 0.

The backoff operation may succeed on the second link while the data frame is transmitted on the first link. In the instant case, the AP2 of the AP MLD1 may transmit, on the second link, a frame (e.g., data frame) including an AC data unit (e.g., AC_VI data unit, AC_VI PPDU, AC_VI MPDU) associated with the corresponding backoff operation at a boundary of a slot in which the counter value becomes 0. The data frames on the first link and the second link may be transmitted to the same STA MLD (e.g., STA MLD1). The STA MLD1 may be an NSTR STA MLD that does not support STR operations.

The transmission operation of the data frame (e.g., AC_VI frame) on the second link may be started after the transmission operation the data frame (e.g., AC_BE frame) on the first link. In addition, a transmission completion time of the AC_VI frame on the second link may be after a transmission completion time of the AC_BE frame on the first link. In the instant case, even when the backoff operation for the AC_VI frame is successful on the second link, the AP2 may not start the transmission operation of the AC_VI frame when the backoff counter value becomes 0. That is, the transmission operation of the AC_VI frame on the second link may be delayed after a reception time of a BA frame for the AC_BE frame on the first link. The AP2 may start the transmission operation of the AC_VI frame on the second link after a preset time (e.g., SIFS, point coordination function (PCF) interframe space (PIFS), distributed coordination function (DCF) interframe space (DIFS), arbitration interface space (AIFS)) elapses from a reception completion time of a BA frame for the AC_BE frame on the first link. Alternatively, the AP2 may start the transmission operation of the AC_VI frame on the second link immediately after a reception completion time of a BA frame for the AC_BE frame on the first link.

Since the STA MLD1 is an NSTR STA MLD that does not support STR operations, a blindness period may occur when frame transmission and reception operations are performed on the multi-link. In the instant case, a frame transmission operation may be delayed after the blindness period. That is, the AP MLD1 may transmit a frame to the STA MLD1 after the blindness period. The above-described operation of delaying frame transmission (e.g., transmission stand-by operation) may be performed based on assumption that the corresponding frame (e.g., data) does not exist in a queue. The above-described operation of starting frame transmission may be performed based on assumption that the corresponding frame (e.g., data) exists in a queue at a time of transmission.

Figure 8:
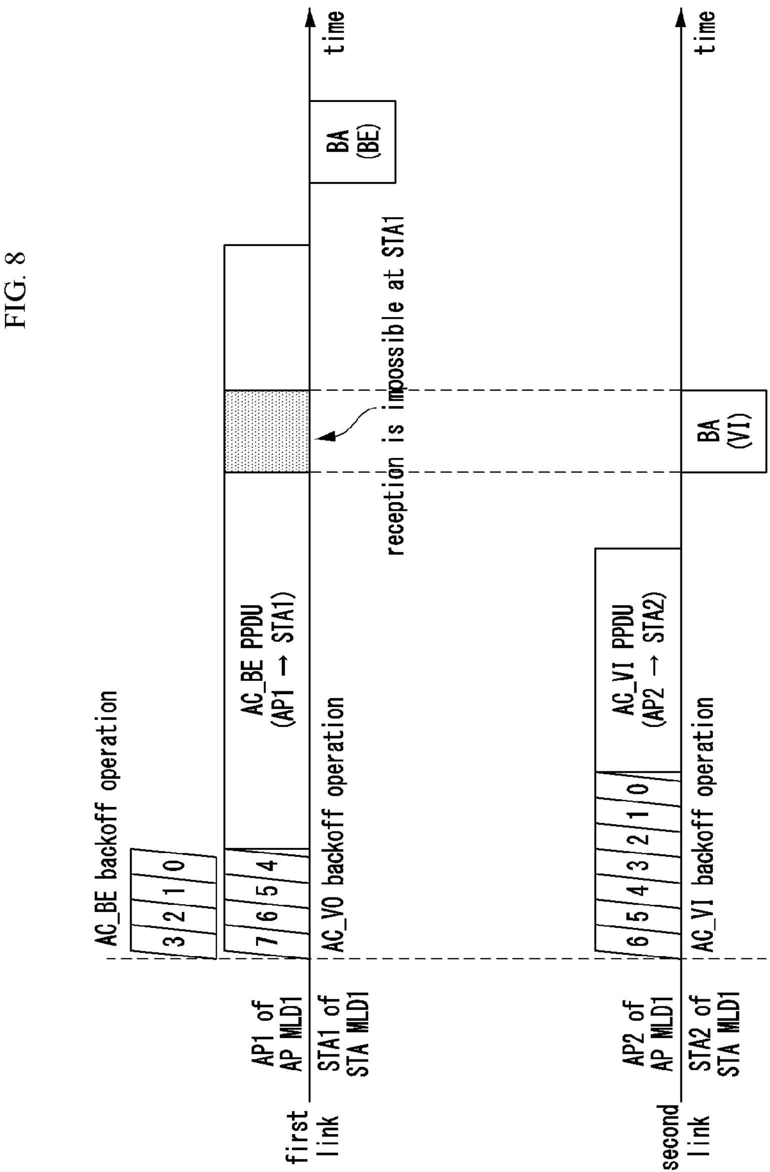
FIG. 8 is a timing diagram illustrating various exemplary embodiments of a channel access method for data frame transmission in a wireless LAN system supporting a multi-link.

FIG. 8 is a timing diagram illustrating a sixth exemplary embodiment of a channel access method for data frame transmission in a wireless LAN system supporting a multi-link.

As shown in FIG. 8, an AP MLD that supports STR operations may be referred to as 'STR AP MLD', and a non-AP MLD that does not support STR operations may be referred to as 'NSTR non-AP MLD (or NSTR STA MLD)'. An AP MLD1 may be a STR AP MLD, and a STA MLD1 may be an NSTR STA MLD. The AP MLD1 may transmit and receive data frames with the STA MLD1 using a multi-link. An AP1 of the AP MLD1 and a STA1 of the STA MLD1 may operate on a first link, and an AP2 of the AP MLD1 and a STA2 of the STA MLD1 may operate on a second link. Each of the AP1 and the AP2 may perform a backoff operation to transmit a frame on each operating link.

The backoff operation may be an EDCAF. The backoff operation may be performed independently on each of the first link and the second link. The backoff operations on the first link and the second link may be backoff operations for the same access category (AC). Alternatively, the backoff operations on the first link and the second link may be backoff operations for different ACs. A plurality of backoff operations (e.g., a plurality of backoff operations for a plurality of ACs) may be performed on one link. Value(s) of EDCA parameter(s) for backoff operations may be different for each AC.

The backoff operation may succeed first on one (e.g., first link) of the first link and the second link. For example, the backoff operation may succeed first on a link (e.g., first link) for which a small backoff counter value is selected. A plurality of backoff operations for a plurality of AC data units may be performed simultaneously. Among the plurality of backoff operations, a backoff operation whose counter value reaches 0 first may be determined to be successful. When the backoff operation is successful on the first link (e.g., when the backoff counter value of the backoff operation becomes 0), the AP1 of AP the MLD1 may transmit, on the first link, a frame (e.g., data frame) including an AC data unit (e.g., AC_BE data unit, AC_BE PPDU, AC_BE MPDU) associated with the corresponding backoff operation at a boundary of a slot in which the counter value becomes 0.

The backoff operation may succeed on the second link while the data frame is transmitted on the first link. In the instant case, the AP2 of the AP MLD1 may transmit a frame (e.g., data frame) including an AC data unit (e.g., AC_VI data unit, AC_VI PPDU, AC_VI MPDU) associated with the corresponding backoff operation at a boundary of a slot in which the counter value becomes 0. The data frames on the first link and the second link may be transmitted to the same STA MLD (e.g., STA MLD1). The STA MLD1 may be an NSTR STA MLD that does not support STR operations.

The STA MLD1 may receive the data frames on the multi-link (e.g., first link and second link). When reception of a data frame is completed on one link (e.g., second link) of the multi-link, the STA2 of the STA MLD1 may transmit a BA frame (e.g., ACK frame) on the second link after a SIFS elapses from a reception completion time of the data frame. In the instant case, the transmission operation of the BA frame on the second link and the reception operation of the data frame on the first link may be performed simultaneously. However, the STA MLD1 cannot perform a STR operation because it is an NSTR STA MLD. Therefore, while the BA frame is transmitted on the second link, the STA1 may not receive the data frame on the first link. A period in which the reception operation cannot be performed on the first link while the transmission operation is performed on the second link may be referred to as a blindness period. The STA1 may not receive a part of the data frame during the blindness period. In the instant case, a result of an error check (e.g., CRC) on the data frame, which is performed in the STA1, may be a failure (e.g., error occurs).

FIG. 9 is a timing diagram illustrating a seventh exemplary embodiment of a channel access method for data frame transmission in a wireless LAN system supporting a multi-link.

As shown in FIG. 9, an AP MLD that supports STR operations may be referred to as 'STR AP MLD', and a non-AP MLD that does not support STR operations may be referred to as 'NSTR non-AP MLD (or NSTR STA MLD)'. An AP MLD1 may be a STR AP MLD, and a STA MLD1 may be an NSTR STA MLD. The AP MLD1 may transmit and receive data frames with the STA MLD1 using a multi-link. An AP1 of the AP MLD1 and a STA1 of the STA MLD1 may operate on a first link, and an AP2 of the AP MLD1 and a STA2 of the STA MLD1 may operate on a second link. Each of the AP1 and the AP2 may perform a backoff operation to transmit a frame on each operating link.

The backoff operation may be an EDCAF. The backoff operation may be performed independently on each of the first link and the second link. The backoff operations on the first link and the second link may be backoff operations for the same AC. Alternatively, the backoff operations on the first link and the second link may be backoff operations for different ACs. A plurality of backoff operations (e.g., a plurality of backoff operations for a plurality of ACs) may be performed on one link. Value(s) of EDCA parameter(s) for backoff operations may be different for each AC.

The backoff operation may succeed first on one (e.g., first link) of the first link and the second link. For example, the backoff operation may succeed first on a link (e.g., first link) for which a small backoff counter value is selected. A plurality of backoff operations for a plurality of AC data units may be performed simultaneously. Among the plurality of backoff operations, a backoff operation whose counter value reaches 0 first may be determined to be successful. When the backoff operation is successful on the first link (e.g., when the backoff counter value of the backoff operation becomes 0), the AP1 of AP the MLD1 may transmit, on the first link, a frame (e.g., data frame) including an AC data unit (e.g., AC_BE data unit, AC_BE PPDU, AC_BE MPDU) associated with the corresponding backoff operation at a boundary of a slot in which the counter value becomes 0.

The backoff operation may succeed on the second link while the data frame is transmitted on the first link. In the instant case, the AP2 of the AP MLD1 may transmit, on the second link, a frame (e.g., data frame) including an AC data unit (e.g., AC_VI data unit, AC_VI PPDU, AC_VI MPDU) associated with the corresponding backoff operation at a boundary of a slot in which the counter value becomes 0. The data frames on the first link and the second link may be transmitted to the same STA MLD (e.g., STA MLD1). The STA MLD1 may be an NSTR STA MLD that does not support STR operations.

The STA MLD1 may receive the data frames on the multi-link (e.g., first link and second link). When reception of a data frame is completed on one (e.g., second link) of the multi-link, the STA MLD1 may check whether reception of a data frame is in progress on another link (e.g., first link). When the data frame reception operation is in progress on the first link, the STA2 of the STA MLD1 may wait for transmission of a BA frame for the AC_VI PPDU until a transmission time of a BA frame for the AC_BE PPDU on the first link. The STA MLD1 may transmit BA frames simultaneously on the first link and the second link. That is, the transmission of the BA frame on the second link may be delayed after reception of the data frame on the first link.

The AP2 may configure a TXOP on the second link to (a time required for transmission of the data frame+SIFS+a time required for reception of a BA frame). For example, the AP2 may set a duration field in a MAC header of an MPDU included in the data frame to (a time required for transmission of the data frame+SIFS+a time required for reception of a BA frame). The transmission of the BA frame on the second link may be delayed, and in the instant case, the transmission of the BA frame may be performed after the TXOP configured by the AP2. Therefore, the STA2 may transmit the BA frame after performing a backoff operation. When the backoff operation for the BA frame on the second link is successful before transmission of the BA frame on the first link, the STA MLD1 may transmit the BA frames on the first link and the second link simultaneously. That is, the transmissions of the BA frames on the first link and the second link may be synchronized transmissions. When the backoff operation for the BA frame on the second link is not successful before transmission of the BA frame on the first link, the STA MLD1 may transmit the BA frame after the backoff operation on the second link is completed.

Figure 10:
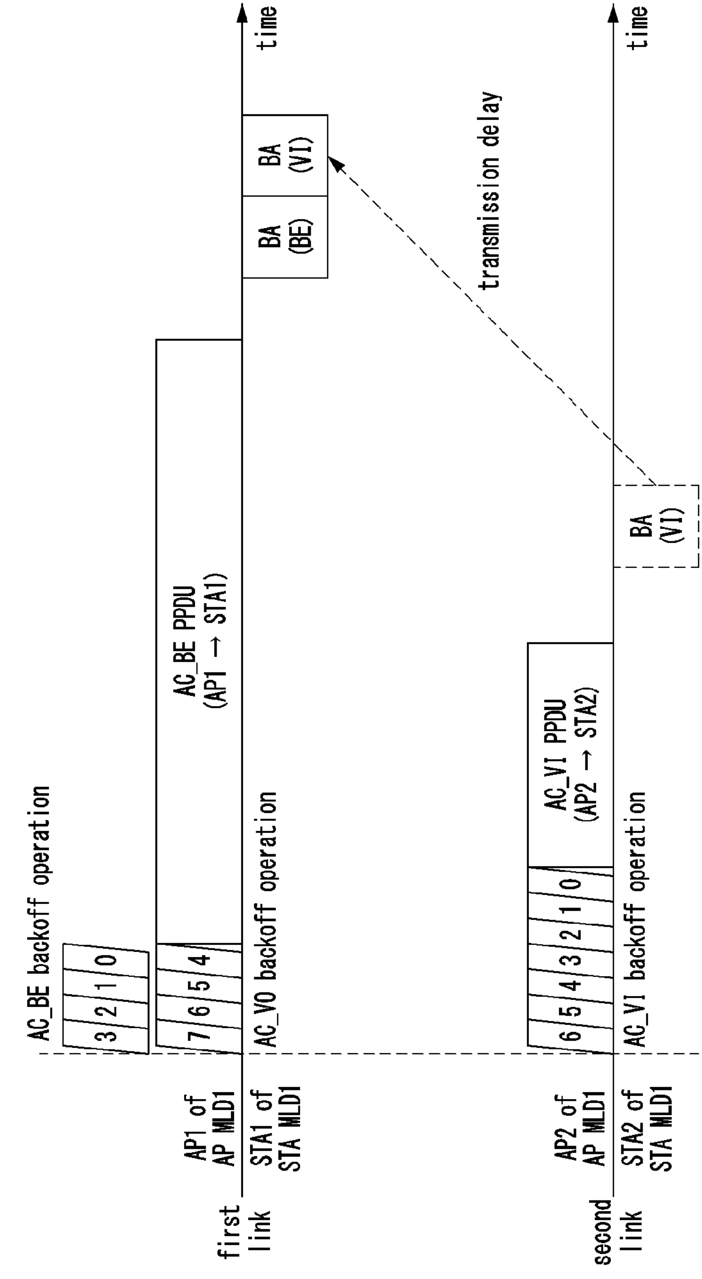
FIG. 10 is a timing diagram illustrating various exemplary embodiments of a channel access method for data frame transmission in a wireless LAN system supporting a multi-link.

FIG. 10 is a timing diagram illustrating an eighth exemplary embodiment of a channel access method for data frame transmission in a wireless LAN system supporting a multi-link.

As shown in FIG. 10, an AP MLD that supports STR operations may be referred to as 'STR AP MLD', and a non-AP MLD that does not support STR operations may be referred to as 'NSTR non-AP MLD (or NSTR STA MLD)'. An AP MLD1 may be a STR AP MLD, and a STA MLD1 may be an NSTR STA MLD. The AP MLD1 may transmit and receive data frames with the STA MLD1 using a multi-link. An AP1 of the AP MLD1 and a STA1 of the STA MLD1 may operate on a first link, and an AP2 of the AP MLD1 and a STA2 of the STA MLD1 may operate on a second link. Each of the AP1 and the AP2 may perform a backoff operation to transmit a frame on each operating link.

The backoff operation may be an EDCAF. The backoff operation may be performed independently on each of the first link and the second link. The backoff operations on the first link and the second link may be backoff operations for the same AC. Alternatively, the backoff operations on the first link and the second link may be backoff operations for different ACs. A plurality of backoff operations (e.g., a plurality of backoff operations for a plurality of ACs) may be performed on one link. Value(s) of EDCA parameter(s) for backoff operations may be different for each AC.

The backoff operation may succeed first on one (e.g., first link) of the first link and the second link. For example, the backoff operation may succeed first on a link (e.g., first link) for which a small backoff counter value is selected. A plurality of backoff operations for a plurality of AC data units may be performed simultaneously. Among the plurality of backoff operations, a backoff operation whose counter value reaches 0 first may be determined to be successful. When the backoff operation is successful on the first link (e.g., when the backoff counter value of the backoff operation becomes 0), the AP1 of AP the MLD1 may transmit, on the first link, a frame (e.g., data frame) including an AC data unit (e.g., AC_BE data unit, AC_BE PPDU, AC_BE MPDU) associated with the corresponding backoff operation at a boundary of a slot in which the counter value becomes 0.

The backoff operation may succeed on the second link while the data frame is transmitted on the first link. In the instant case, the AP2 of the AP MLD1 may transmit, on the second link, a frame (e.g., data frame) including an AC data unit (e.g., AC_VI data unit, AC_VI PPDU, AC_VI MPDU) associated with the corresponding backoff operation at a boundary of a slot in which the counter value becomes 0. The data frames on the first link and the second link may be transmitted to the same STA MLD (e.g., STA MLD1). The STA MLD1 may be an NSTR STA MLD that does not support STR operations.

The STA MLD1 may receive the data frames on the multi-link (e.g., first link and second link). When reception of a data frame is completed on one link (e.g., second link) of the multi-link, the STA MLD1 may identify whether reception of a data frame is in progress on another link (e.g., first link). When the data frame reception operation is in progress on the first link, the STA2 of the STA MLD1 may not transmit a BA frame for the AC_VI PPDU. When reception of the data frame is completed on the first link, the STA1 may transmit, on the first link, a BA frame (hereinafter referred to as 'first BA frame') for the AC_BE PPDU on the first link and a BA frame for the AC_VI PPDU (hereinafter referred to as 'second BA frame') on the second link after a SIFS elapses from a reception completion time of the data frame. That is, the second BA frame and the first BA frame may be transmitted together on the first link.

The first BA frame and the second BA frame may be configured in a form of an A-MPDU. Alternatively, the first BA frame and the second BA frame may be transmitted on the first link with an interval of an SIFS. Alternatively, a ACK bitmap may be extended. For example, one BA frame transmitted on the first link may include reception status information (e.g., ACK/NACK information) for the AC_BE PPDU received on the first link and reception status information (e.g., ACK/NACK information) for the AC_VI PPDU received on the second link. The TXOP for transmission of the AC_BE PPDU on the first link may be configured considering a time required for transmission of the second BA frame. That is, the TXOP may be configured to be (a time required for transmission of the AC_VI data frame+SIFS+a time required for transmission of the first BA frame+a time required for transmission of the second BA frame) or (a time required for transmission of the AC_VI data frame+SIFS+a time required for transmission of the first BA frame+SIFS+a time required for transmission of the second BA frame). For example, the AP1 may set a duration field in a MAC header of an MPDU included in the data frame to (a time required for transmission of the AC_VI data frame+SIFS+a time required for transmission of the first BA frame+a time required for transmission of the second BA frame) or (a time required for transmission of the AC_VI data frame+SIFS+a time required for transmission of the first BA frame+SIFS+a time required for transmission of the second BA frame).

Figure 11:
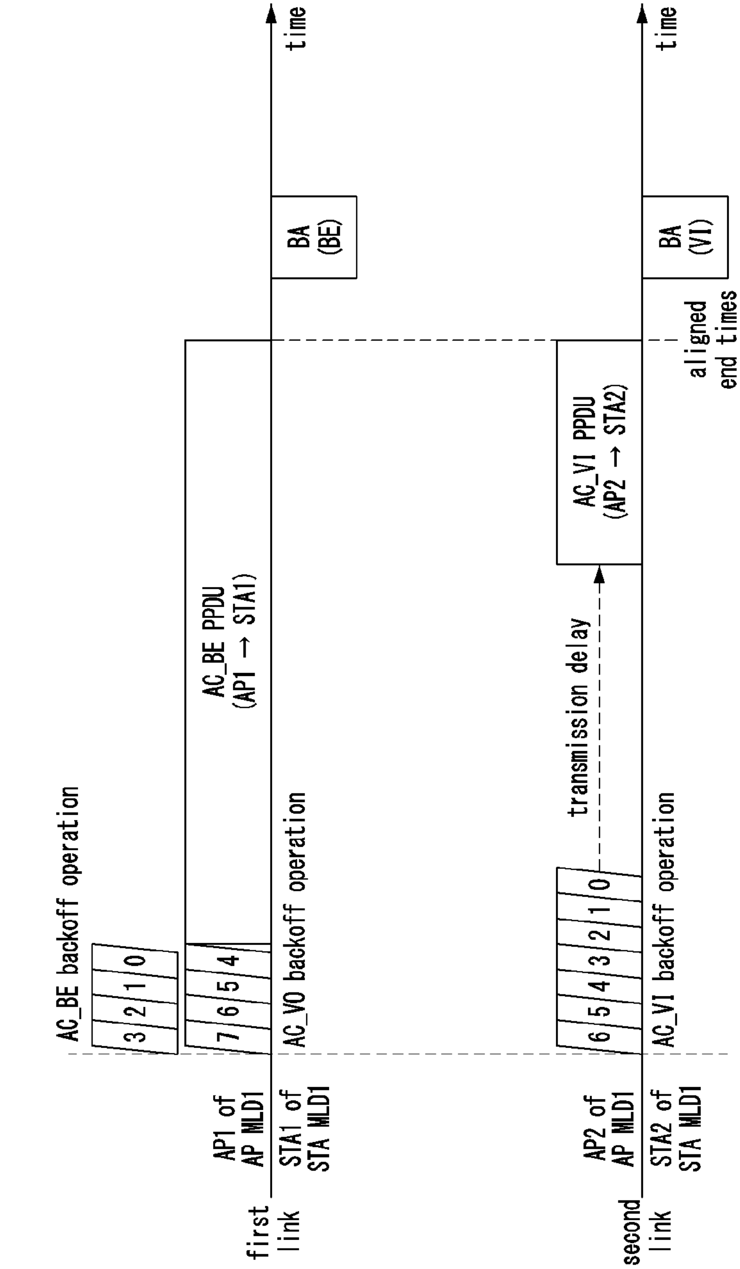
FIG. 11 is a timing diagram illustrating various exemplary embodiments of a channel access method for data frame transmission in a wireless LAN system supporting a multi-link.

FIG. 11 is a timing diagram illustrating a ninth exemplary embodiment of a channel access method for data frame transmission in a wireless LAN system supporting a multi-link.

As shown in FIG. 11, an AP MLD that supports STR operations may be referred to as 'STR AP MLD', and a non-AP MLD that does not support STR operations may be referred to as 'NSTR non-AP MLD (or NSTR STA MLD)'. An AP MLD1 may be a STR AP MLD, and a STA MLD1 may be an NSTR STA MLD. The AP MLD1 may transmit and receive data frames with the STA MLD1 using a multi-link. An AP1 of the AP MLD1 and a STA1 of the STA MLD1 may operate on a first link, and an AP2 of the AP MLD1 and a STA2 of the STA MLD1 may operate on a second link. Each of the AP1 and the AP2 may perform a backoff operation to transmit a frame on each operating link.

The backoff operation may be an EDCAF. The backoff operation may be performed independently on each of the first link and the second link. The backoff operations on the first link and the second link may be backoff operations for the same AC. Alternatively, the backoff operations on the first link and the second link may be backoff operations for different ACs. A plurality of backoff operations (e.g., a plurality of backoff operations for a plurality of ACs) may be performed on one link. Value(s) of EDCA parameter(s) for backoff operations may be different for each AC.

The backoff operation may succeed first on one (e.g., first link) of the first link and the second link. For example, the backoff operation may succeed first on a link (e.g., first link) for which a small backoff counter value is selected. A plurality of backoff operations for a plurality of AC data units may be performed simultaneously. Among the plurality of backoff operations, a backoff operation whose counter value reaches 0 first may be determined to be successful. When the backoff operation is successful on the first link (e.g., when the backoff counter value of the backoff operation becomes 0), the AP1 of AP the MLD1 may transmit, on the first link, a frame (e.g., data frame) including an AC data unit (e.g., AC_BE data unit, AC_BE PPDU, AC_BE MPDU) associated with the corresponding backoff operation at a boundary of a slot in which the counter value becomes 0.

The backoff operation may succeed on the second link while the data frame is transmitted on the first link. In the instant case, the AP2 of the AP MLD1 may transmit, on the second link, a frame (e.g., data frame) including an AC data unit (e.g., AC_VI data unit, AC_VI PPDU, AC_VI MPDU) associated with the corresponding backoff operation at a boundary of a slot in which the counter value becomes 0.

The data frames on the first link and the second link may be transmitted to the same STA MLD (e.g., STA MLD1). The STA MLD1 may be an NSTR STA MLD that does not support STR operations. An end time of a transmission period of the AC_VI frame from a time at which the backoff counter value becomes 0 on the second link may be before a transmission completion time of the AC_BE frame on the first link. In the instant case, the AP2 may not transmit the AC_VI frame at a time at which the backoff counter value becomes 0 on the second link. That is, transmission of the AC_VI frame on the second link may be delayed.

In order to match a transmission completion time of the AC_BE frame on the first link and a transmission completion time of the AC_VI frame on the second link, the AP MLD1 (e.g., AP2) may identify a transmission delay period of the AC_VI frame on the second link, and transmit the AC_VI frame after the identified transmission delay period. The STA MLD1 may receive the data frames on the first link and the second link, and may transmit BA frames on the first link and the second link after a SIFS elapses from a reception completion time of the data frames. For example, the STA1 may transmit the BA frame for the AC_BE frame on the first link and transmit the BA frame for the AC_VI frame on the second link. The BA frames may be transmitted simultaneously on the first link and the second link.

Figure 12:
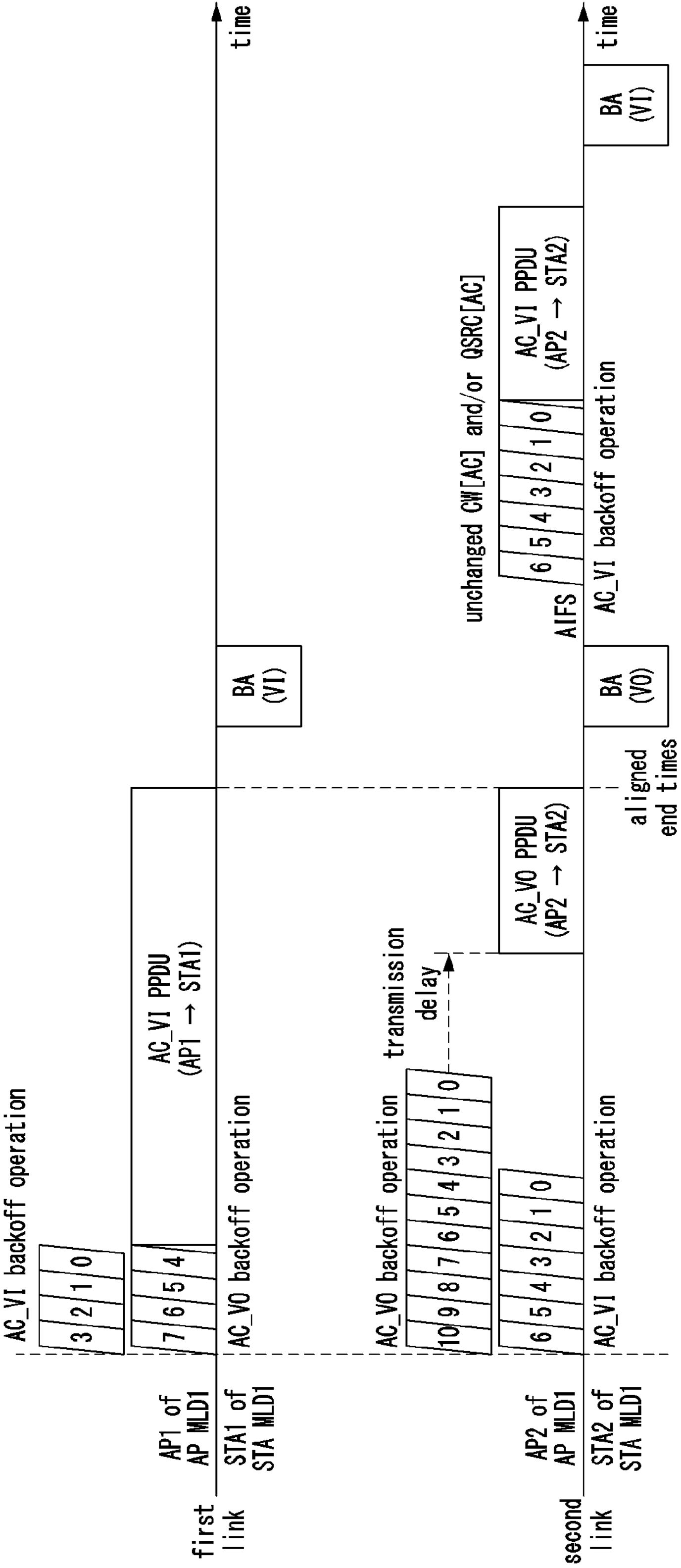
FIG. 12 is a timing diagram illustrating various exemplary embodiments of a channel access method for data frame transmission in a wireless LAN system supporting a multi-link.

FIG. 12 is a timing diagram illustrating a tenth exemplary embodiment of a channel access method for data frame transmission in a wireless LAN system supporting a multi-link.

As shown in FIG. 12, an AP MLD that supports STR operations may be referred to as 'STR AP MLD', and a non-AP MLD that does not support STR operations may be referred to as 'NSTR non-AP MLD (or NSTR STA MLD)'. An AP MLD1 may be a STR AP MLD, and a STA MLD1 may be an NSTR STA MLD. The AP MLD1 may transmit and receive data frames with the STA MLD1 using a multi-link. An AP1 of the AP MLD1 and a STA1 of the STA MLD1 may operate on a first link, and an AP2 of the AP MLD1 and a STA2 of the STA MLD1 may operate on a second link. Each of the AP1 and the AP2 may perform a backoff operation to transmit a frame on each operating link.

The backoff operation may be an EDCAF. The backoff operation may be performed independently on each of the first link and the second link. The backoff operations on the first link and the second link may be backoff operations for the same AC. Alternatively, the backoff operations on the first link and the second link may be backoff operations for different ACs. A plurality of backoff operations (e.g., a plurality of backoff operations for a plurality of ACs) may be performed on one link. Value(s) of EDCA parameter(s) for backoff operations may be different for each AC.

The backoff operation may succeed first on one (e.g., first link) of the first link and the second link. For example, the backoff operation may succeed first on a link (e.g., first link) for which a small backoff counter value is selected. A plurality of backoff operations for a plurality of AC data units may be performed simultaneously. Among the plurality of backoff operations, a backoff operation whose counter value reaches 0 first may be determined to be successful. When the backoff operation is successful on the first link (e.g., when the backoff counter value of the backoff operation becomes 0), the AP1 of AP the MLD1 may transmit, on the first link, a frame (e.g., data frame) including an AC data unit (e.g., AC_VI data unit, AC_VI PPDU, AC_VI MPDU) associated with the corresponding backoff operation at a boundary of a slot in which the counter value becomes 0.

The backoff operation may succeed on the second link while the data frame is transmitted on the first link. Two backoff operations may be performed simultaneously on the second link. For example, on the second link, a backoff operation for the AC_VO frame and the backoff operation for the AC_VI frame may be performed simultaneously. On the second link, the backoff operation for the AC_VI frame may be completed before the backoff operation for the AC_VO frame. For example, a backoff counter value of the AC_VI backoff operation may become 0 before a backoff counter value of the AC_VO backoff operation. Destinations of the AC_VI frame for which the backoff operation is completed first on the second link and the AC_VI frame being transmitted on the first link may be the same (e.g., STA MLD1). An end time of a transmission period of the data frame (e.g., AC_VI frame) from a time at which the backoff counter value becomes 0 on the second link may be before a transmission completion time of the AC_VI frame on the first link. In the instant case, the AP2 may not transmit the data frame (e.g., AC_VI frame) at the time when the backoff counter value becomes 0 on the second link. That is, transmission of the data frame (e.g., AC_VI frame) on the second link may be delayed (e.g., waited) to match the transmission completion times of the data frames on the first link and the second link to each other.

Meanwhile, the backoff operation for the AC_VO frame may be completed while waiting for transmission of the AC_VI frame on the second link. In the instant case, in order to transmit one data frame on the second link, one data frame may be selected based on an internal collision resolution procedure. In the internal contention resolution procedure, a data frame associated with an AC with a higher priority among the data frames may be selected. The priorities of ACs may be as shown in Table 1. Because the priority of AC_VO is higher than that of AC_VI, the AP MLD1 (e.g., AP2) may select the AC_VO frame. That is, the AP2 may transmit the AC_VO frame on the second link.

Destinations of the AC_VO frame on the second link and the AC_VI frame being transmitted on the first link may be the same (e.g., STA MLD1). An end time of a transmission period of the data frame (e.g., AC_VO frame) from a time at which the backoff counter value becomes 0 on the second link may be before a transmission completion time of the AC_VI frame on the first link. In the instant case, the AP2 may not transmit the data frame (e.g., AC_VO frame) at the time when the backoff counter value becomes 0 on the second link. That is, transmission of the data frame (e.g., AC_VO frame) on the second link may be delayed (e.g., waited) to match the transmission completion times of the data frames on the first link and the second link to each other.

In order to match the transmission completion time of the AC_VI frame on the first link and the transmission completion time of the AC_VO frame on the second link, the AP MLD1 (e.g., AP2) may identify a transmission delay period of the AC_VO frame on the second link, and transmit the AC_VO frame after the identified transmission delay period. The STA MLD1 may receive the data frames on the first link and the second link, and may transmit BA frames on the first link and the second link after a SIFS elapsed from a reception completion time of the data frames. For example, STA1 may transmit the BA frame for the AC_VI frame on the first link and the BA frame for the AC_VO frame on the second link. The BA frames may be transmitted simultaneously on the first link and the second link.

The AP2 may perform a transmission operation of the AC_VI frame that failed to be transmitted by the internal contention resolution procedure after receiving the BA frame for the AC_VO frame on the second link. Since the transmission of the AC_VI frame failed due to the internal contention resolution procedure, the AP2 may perform a backoff operation for transmission of the AC_VI frame. The backoff operation for the AC_VI frame may be performed using unchanged EDCA parameter(s) (e.g., the same EDCA parameter(s) used in the previous backoff operation). Alternatively, the backoff operation for the AC_VI frame may be performed using doubled EDCA parameter(s). The EDCA parameter(s) may include CW[AC] and/or QSRC[AC]. The contention window (CW) may be a CW for each AC. The quality of service (QoS) short retry counter (QSRC) may be a QSRC for each AC.

FIG. 13 is a timing diagram illustrating an eleventh exemplary embodiment of a channel access method for data frame transmission in a wireless LAN system supporting a multi-link.

As shown in FIG. 13, an AP MLD that supports STR operations may be referred to as 'STR AP MLD', and a non-AP MLD that does not support STR operations may be referred to as 'NSTR non-AP MLD (or NSTR STA MLD)'. An AP MLD1 may be a STR AP MLD, and a STA MLD1 may be an NSTR STA MLD. The AP MLD1 may transmit and receive data frames with the STA MLD1 using a multi-link. An AP1 of the AP MLD1 and a STA1 of the STA MLD1 may operate on a first link, and an AP2 of the AP MLD1 and a STA2 of the STA MLD1 may operate on a second link. Each of the AP1 and the AP2 may perform a backoff operation to transmit a frame on each operating link.

The backoff operation may be an EDCAF. The backoff operation may be performed independently on each of the first link and the second link. The backoff operations on the first link and the second link may be backoff operations for the same AC. Alternatively, the backoff operations on the first link and the second link may be backoff operations for different ACs. A plurality of backoff operations (e.g., a plurality of backoff operations for a plurality of ACs) may be performed on one link. Value(s) of EDCA parameter(s) for backoff operations may be different for each AC.

The backoff operation may succeed first on one (e.g., first link) of the first link and the second link. For example, the backoff operation may succeed first on a link (e.g., first link) for which a small backoff counter value is selected. A plurality of backoff operations for a plurality of AC data units may be performed simultaneously. Among the plurality of backoff operations, a backoff operation whose counter value reaches 0 first may be determined to be successful. When the backoff operation is successful on the first link (e.g., when the backoff counter value of the backoff operation becomes 0), the AP1 of AP the MLD1 may transmit, on the first link, a frame (e.g., data frame) including an AC data unit (e.g., AC_VI data unit, AC_VI PPDU, AC_VI MPDU) associated with the corresponding backoff operation at a boundary of a slot in which the counter value becomes 0.

The backoff operation may succeed on the second link while the data frame is transmitted on the first link. Two backoff operations may be performed simultaneously pm the second link. For example, on the second link, a backoff operation for the AC_VO frame and the backoff operation for the AC_VI frame may be performed simultaneously. On the second link, the backoff operation for the AC_VI frame may be completed before the backoff operation for the AC_VO frame. For example, a backoff counter value of the AC_VI backoff operation may become 0 before a backoff counter value of the AC_VO backoff operation. Destinations of the AC_VI frame for which the backoff operation is completed first on the second link and the AC_VI frame being transmitted on the first link may be the same (e.g., STA MLD1). An end time of a transmission period of the data frame (e.g., AC_VI frame) from a time at which the backoff counter value becomes 0 on the second link may be before a transmission completion time of the AC_VI frame on the first link. In the instant case, the AP2 may not transmit the data frame (e.g., AC_VI frame) at the time when the backoff counter value becomes 0 on the second link. That is, transmission of the data frame (e.g., AC_VI frame) on the second link may be delayed (e.g., waited) to match the transmission completion times of the data frames on the first link and the second link to each other.

Meanwhile, the backoff operation for the AC_VO frame may be completed while waiting for transmission of the AC_VI frame on the second link. In the instant case, in order to transmit one data frame on the second link, one data frame may be selected based on an internal collision resolution procedure. In the internal contention resolution procedure, a data frame for which the backoff operation is completed first among the data frames may be selected. Because the backoff operation of the AC_VI frame is completed before the AC_VO backoff operation, the AP MLD1 (e.g., AP2) may select the AC_VI frame. That is, the AP2 may transmit the AC_VI frame on the second link.

In order to match the transmission completion time of the AC_VI frame on the first link and the transmission completion time of the AC_VI frame on the second link, the AP MLD1 (e.g., AP2) may identify a transmission delay period of the AC_VI frame on the second link, and transmit the AC_VI frame after the identified transmission delay period. The STA MLD1 may receive the data frames on the first link and the second link, and may transmit BA frames on the first link and the second link after a SIFS elapsed from a reception completion time of the data frames. For example, STA1 may transmit the BA frame for the AC_VI frame on the first link and the BA frame for the AC_VI frame on the second link. The BA frames may be transmitted simultaneously on the first link and the second link.

The AP2 may perform a transmission operation of the AC_VO frame that failed to be transmitted by the internal contention resolution procedure after receiving the BA frame for the AC_VI frame on the second link. Since the transmission of the AC_VO frame failed due to the internal contention resolution procedure, the AP2 may perform a backoff operation for transmission of the AC_VO frame. The backoff operation for the AC_VO frame may be performed using unchanged EDCA parameter(s) (e.g., the same EDCA parameter(s) used in the previous backoff operation). Alternatively, the backoff operation for the AC_VO frame may be performed using doubled EDCA parameter(s).

Figure 14:
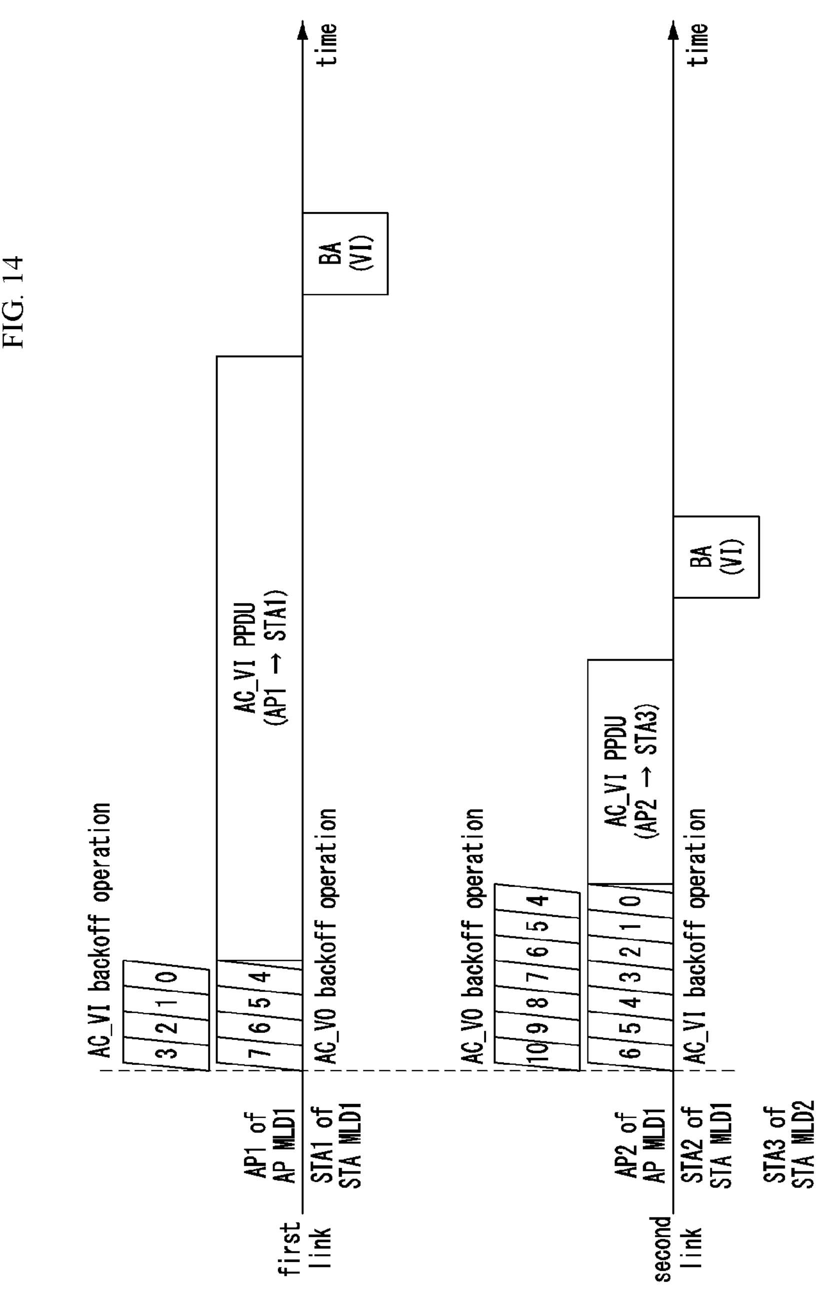
FIG. 14 is a timing diagram illustrating a twelfth exemplary embodiment of a channel access method for data frame transmission in a wireless LAN system supporting a multi-link.

FIG. 14 is a timing diagram illustrating a twelfth exemplary embodiment of a channel access method for data frame transmission in a wireless LAN system supporting a multi-link.

As shown in FIG. 14, an AP MLD that supports STR operations may be referred to as 'STR AP MLD', and a non-AP MLD that does not support STR operations may be referred to as 'NSTR non-AP MLD (or NSTR STA MLD)'. An AP MLD1 may be a STR AP MLD, and a STA MLD1 may be an NSTR STA MLD. The AP MLD1 may transmit and receive data frames with the STA MLD1 using a multi-link. An AP1 of the AP MLD1 and a STA1 of the STA MLD1 may operate on a first link, and an AP2 of the AP MLD1 and a STA2 of the STA MLD1 may operate on a second link. Each of the AP1 and the AP2 may perform a backoff operation to transmit a frame on each operating link.

The backoff operation may be an EDCAF. The backoff operation may be performed independently on each of the first link and the second link. The backoff operations on the first link and the second link may be backoff operations for the same AC. Alternatively, the backoff operations on the first link and the second link may be backoff operations for different ACs. A plurality of backoff operations (e.g., a plurality of backoff operations for a plurality of ACs) may be performed on one link. Value(s) of EDCA parameter(s) for backoff operations may be different for each AC.

The backoff operation may succeed first on one (e.g., first link) of the first link and the second link. For example, the backoff operation may succeed first on a link (e.g., first link) for which a small backoff counter value is selected. A plurality of backoff operations for a plurality of AC data units may be performed simultaneously. Among the plurality of backoff operations, a backoff operation whose counter value reaches 0 first may be determined to be successful. When the backoff operation is successful on the first link (e.g., when the backoff counter value of the backoff operation becomes 0), the AP1 of AP the MLD1 may transmit, on the first link, a frame (e.g., data frame) including an AC data unit (e.g., AC_VI data unit, AC_VI PPDU, AC_VI MPDU) associated with the corresponding backoff operation at a boundary of a slot in which the counter value becomes 0.

The backoff operation may succeed on the second link while the data frame is transmitted on the first link. Two backoff operations may be performed simultaneously pm the second link. For example, on the second link, a backoff operation for the AC_VO frame and the backoff operation for the AC_VI frame may be performed simultaneously. On the second link, the backoff operation for the AC_VI frame may be completed before the backoff operation for the AC_VO frame. For example, a backoff counter value of the AC_VI backoff operation may become 0 before a backoff counter value of the AC_VO backoff operation. A destination (e.g., STA MLD2) of the AC_VI frame for which the backoff operation was completed first on the second link may be different from a destination (e.g., STA MLD1) of the AC_VI frame being transmitted on the first link. Since the STA1 of the STA MLD1 on the first link and the STA3 of the STA MLD2 on the second link belong to different STA MLDs, the transmission/reception operation for the STA1 and the transmission/reception operation for the STA3 may be unrelated to NSTR operations. That is, the transmission/reception operation for the STA1 may be performed independently of the transmission/reception operation for the STA3, and the transmission/reception operation for the STA3 may be performed independently of the transmission/reception operation for the STA1. Therefore, the AP2 may transmit the AC_VI frame to the STA3 of the STA MLD2 at a boundary of a slot where the backoff counter for the AC_VI frame becomes 0 on the second link. The STA3 may receive the AC_VI frame from the AP2 on the second link, and may transmit a BA frame to the AP2 after a SIFS elapses from a reception completion time of the AC_VI frame.

Figure 15:
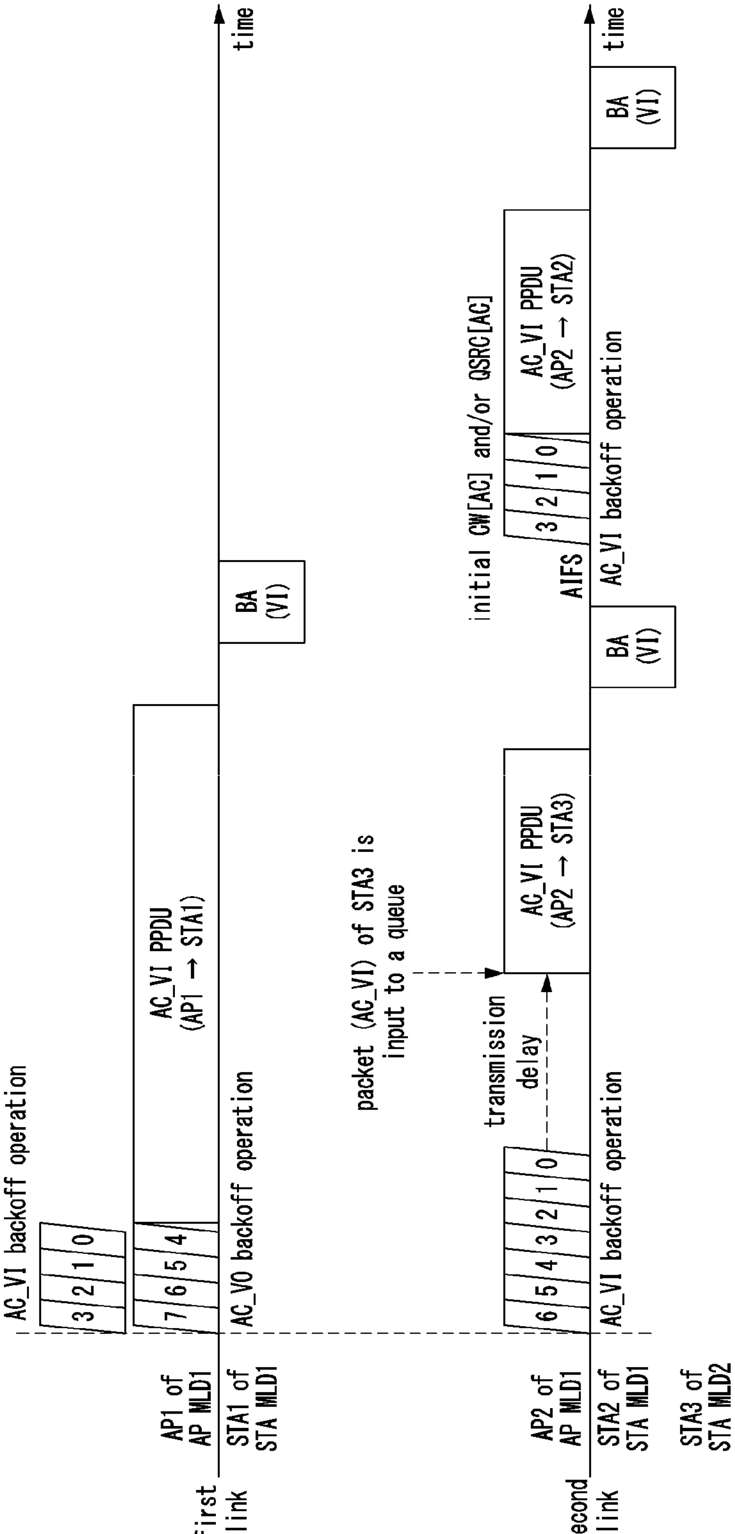
FIG. 15 is a timing diagram illustrating a thirteenth exemplary embodiment of a channel access method for data frame transmission in a wireless LAN system supporting a multi-link.

FIG. 15 is a timing diagram illustrating a thirteenth exemplary embodiment of a channel access method for data frame transmission in a wireless LAN system supporting a multi-link.

As shown in FIG. 15, an AP MLD that supports STR operations may be referred to as 'STR AP MLD', and a non-AP MLD that does not support STR operations may be referred to as 'NSTR non-AP MLD (or NSTR STA MLD)'. An AP MLD1 may be a STR AP MLD, and a STA MLD1 may be an NSTR STA MLD. The AP MLD1 may transmit and receive data frames with the STA MLD1 using a multi-link. An AP1 of the AP MLD1 and a STA1 of the STA MLD1 may operate on a first link, and an AP2 of the AP MLD1 and a STA2 of the STA MLD1 may operate on a second link. Each of the AP1 and the AP2 may perform a backoff operation to transmit a frame on each operating link.

The backoff operation may be an EDCAF. The backoff operation may be performed independently on each of the first link and the second link. The backoff operations on the first link and the second link may be backoff operations for the same AC. Alternatively, the backoff operations on the first link and the second link may be backoff operations for different ACs. A plurality of backoff operations (e.g., a plurality of backoff operations for a plurality of ACs) may be performed on one link. Value(s) of EDCA parameter(s) for backoff operations may be different for each AC.

The backoff operation may succeed first on one (e.g., first link) of the first link and the second link. For example, the backoff operation may succeed first on a link (e.g., first link) for which a small backoff counter value is selected. A plurality of backoff operations for a plurality of AC data units may be performed simultaneously. Among the plurality of backoff operations, a backoff operation whose counter value reaches 0 first may be determined to be successful. When the backoff operation is successful on the first link (e.g., when the backoff counter value of the backoff operation becomes 0), the AP1 of AP the MLD1 may transmit, on the first link, a frame (e.g., data frame) including an AC data unit (e.g., AC_VI data unit, AC_VI PPDU, AC_VI MPDU) associated with the corresponding backoff operation at a boundary of a slot in which the counter value becomes 0.

The backoff operation for the AC_VI frame may succeed on the second link while the data frame is transmitted on the first link. Destinations of the AC_VI frame for which the backoff operation has been completed first on the second link and the AC_VI frame being transmitted on the first link may be the same (e.g., STA MLD1). An end time of a transmission period of the AC_VI frame from a time at which the backoff counter value becomes 0 on the second link may be before a transmission completion time of the AC_VI frame on the first link. In the instant case, the AP2 may not transmit the AC_VI frame at the time when the backoff counter value becomes 0 on the second link. That is, transmission of the AC_VI frame on the second link may be delayed (e.g., waited) to match the transmission completion times of the data frames on the first link and the second link to each other.

While transmission of the AC_VI frame for the STA2 is delayed on the second link, a packet (e.g., data) for other STAs (e.g., STA3 of the STA MLD2) may be enqueued into a queue of the AP2. An AC (e.g., AC_VI) of the packet for the STA3 may be the same as the AC of the AC_VI frame for the STA2. The transmission/reception operation for the STA1 of the STA MLD1 on the first link and the transmission/reception operation for the STA3 of the STA MLD2 on the second link may be unrelated to the NSTR operation. In the above-described situation, since the backoff operation for the AC_VI frame has already succeeded, the AP2 may transmit the AC_VI frame to the STA3 without performing a separate backoff operation.

Since the AC_VI frame for the STA2 exists in the AP2, the AP2 may perform a backoff operation again to transmit the AC_VI frame for the STA2 after transmitting the AC_VI frame for the STA3. The EDCA parameter(s) used in the backoff operation of the AC_VI frame for the STA2 may be initial EDCA parameter(s). That is, since the AC_VI frame (e.g., the AC_VI frame for the STA3) has been transmitted according to the previous successful backoff operation, the AP2 may reset the EDCA parameters to initial values, and perform a backoff operation of the AC_VI frame for the STA2 by use of the initial EDCA parameters.

Figure 16:
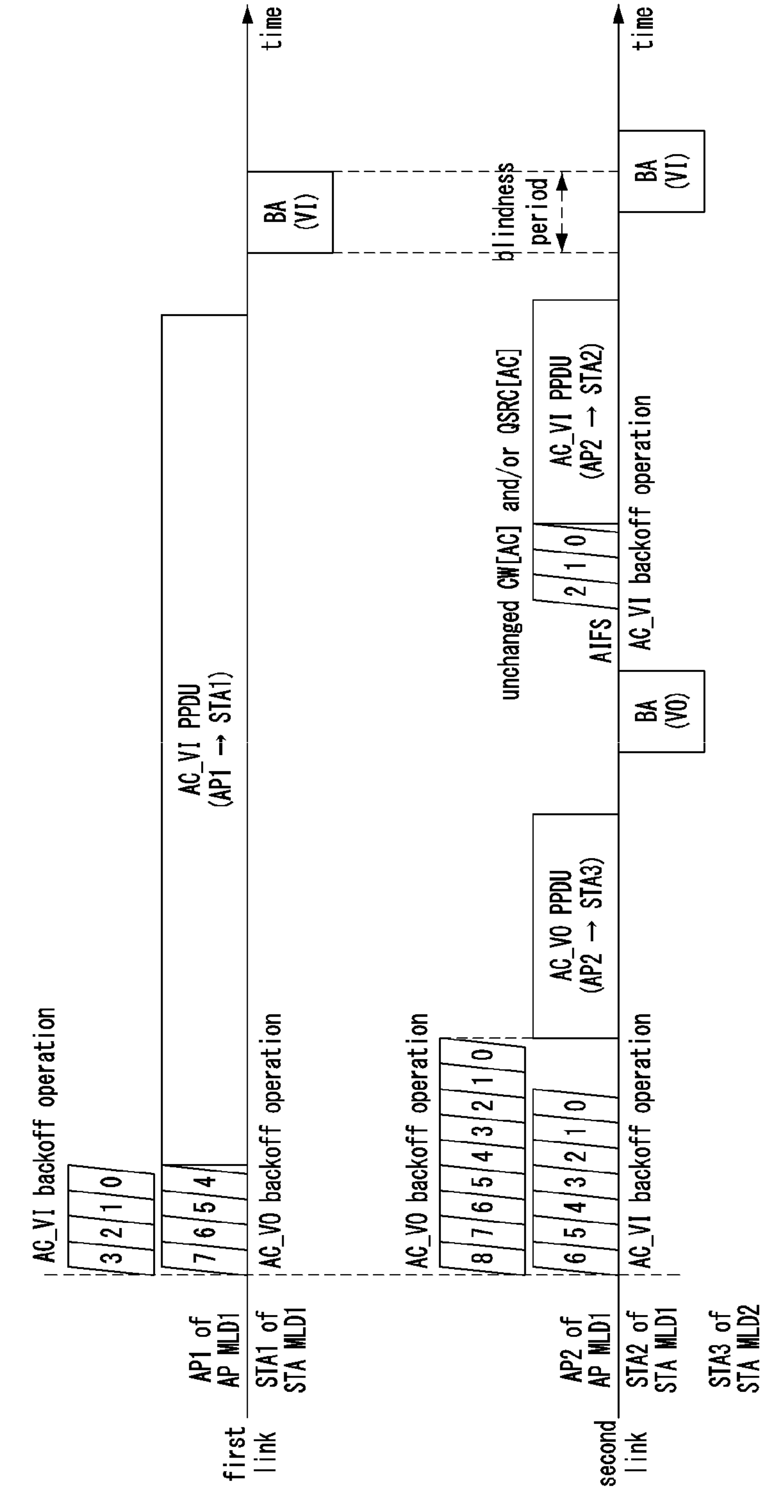
FIG. 16 is a timing diagram illustrating a fourteenth exemplary embodiment of a channel access method for data frame transmission in a wireless LAN system supporting a multi-link.

FIG. 16 is a timing diagram illustrating a fourteenth exemplary embodiment of a channel access method for data frame transmission in a wireless LAN system supporting a multi-link.

As shown in FIG. 16, an AP MLD that supports STR operations may be referred to as 'STR AP MLD', and a non-AP MLD that does not support STR operations may be referred to as 'NSTR non-AP MLD (or NSTR STA MLD)'. An AP MLD1 may be a STR AP MLD, and a STA MLD1 may be an NSTR STA MLD. The AP MLD1 may transmit and receive data frames with the STA MLD1 using a multi-link. An AP1 of the AP MLD1 and a STA1 of the STA MLD1 may operate on a first link, and an AP2 of the AP MLD1 and a STA2 of the STA MLD1 may operate on a second link. Each of the AP1 and the AP2 may perform a backoff operation to transmit a frame on each operating link.

The backoff operation may be an EDCAF. The backoff operation may be performed independently on each of the first link and the second link. The backoff operations on the first link and the second link may be backoff operations for the same access category (AC). Alternatively, the backoff operations on the first link and the second link may be backoff operations for different ACs. A plurality of backoff operations (e.g., a plurality of backoff operations for a plurality of ACs) may be performed on one link. Value(s) of EDCA parameter(s) for backoff operations may be different for each AC.

The backoff operation may succeed first on one (e.g., first link) of the first link and the second link. For example, the backoff operation may succeed first on a link (e.g., first link) for which a small backoff counter value is selected. A plurality of backoff operations for a plurality of AC data units may be performed simultaneously. Among the plurality of backoff operations, a backoff operation whose counter value reaches 0 first may be determined to be successful. When the backoff operation is successful on the first link (e.g., when the backoff counter value of the backoff operation becomes 0), the AP1 of AP the MLD1 may transmit, on the first link, a frame (e.g., data frame) including an AC data unit (e.g., AC_VI data unit, AC_VI PPDU, AC_VI MPDU) associated with the corresponding backoff operation at a boundary of a slot in which the counter value becomes 0.

A plurality of backoff operations may be performed simultaneously on the second link while a data frame is transmitted on the first link. For example, on the second link, the backoff operation for the AC_VO frame and the backoff operation for the AC_VI frame may be performed simultaneously. On the second link, the backoff operation for the AC_VI frame may succeed before the backoff operation for the AC_VO frame. For example, a backoff counter value of the AC_VI backoff operation may become 0 before a backoff counter value of the AC_VO backoff operation. Destinations of the AC_VI frame for which the backoff operation has been completed on the second link and the AC_VI frame being transmitted on the first link may be the same (e.g., STA MLD1). An end time of a transmission period of the AC_VI frame from a time at which the backoff counter value becomes 0 on the second link may be before a transmission completion time of the AC_VI frame on the first link. In the instant case, the AP2 may not transmit the AC_VI frame at the time at which the backoff counter value becomes 0 on the second link. That is, transmission of the AC_VI frame on the second link may be delayed (e.g., waited) to match transmission completion times of the data frames on the first link and the second link. The AP2 may perform an operation of delaying transmission of the AC_VI frame on the second link.

While transmission of the AC_VI frame for the STA2 on the second link is delayed, the backoff operation of the AC_VO frame on the second link may succeed. That is, the backoff counter value of the AC_VO frame may become 0. The destination (e.g., STA MLD2) of the AC_VO frame on the second link may be different from the destination (e.g., STA MLD1) of the AC_VI frame on the first link. In the instant case, in order to transmit one data frame on the second link, the one data frame may be selected based on an internal contention resolution procedure. In the internal contention resolution procedure, the AC_VO frame that is unrelated to an NSTR operation may be selected. That is, the transmission and reception operation for the STA1 of the STA MLD1 on the first link and the transmission and reception operation for the STA3 of the STA MLD2 may not affect the NSTR operation. Therefore, the AP2 may transmit the AC_VO frame to the STA3 on the second link.

Since the AC_VI frame for the STA2 exists in the AP2, the AP2 may perform a backoff operation again to transmit the AC_VI frame for the STA2 after transmitting the AC_VO frame for the STA3. EDCA parameter(s) used in the backoff operation of the AC_VI frame for the STA2 may be unchanged EDCA parameter(s) (e.g., the same EDCA parameter(s) used in the previous backoff operation). When the backoff operation of the AC_VI frame for the STA2 is successful and transmission of the corresponding AC_VI frame can be completed before a blindness period, the AP2 may transmit the AC_VI frame to the STA2 on the second link. On the other hand, when the transmission period of the AC_VI frame on the second link overlaps with the blindness period, the AP2 may transmit the AC_VI frame on the second link after a transmission time of a BA frame on the first link, as in the exemplary embodiment of FIG. 7. That is, transmission of the AC_VI frame on the second link may be delayed.

The exemplary embodiments of the present disclosure may be implemented as program instructions executable by a variety of computers and recorded on a computer-readable medium. The computer-readable medium may include a program instruction, a data file, a data structure, or a combination thereof. The program instructions recorded on the computer-readable medium may be designed and configured specifically for the present disclosure or can be publicly known and available to those who are skilled in the field of computer software.

Examples of the computer-readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "internal", "external", "forwards", and "backwards" are used to describe features of the exemplary embodiments with reference to the positions of such features as displayed in the figures. It will be further understood that the term "connect" or its derivatives refer both to direct and indirect connection.

In the present specification, unless particularly stated otherwise, a singular expression includes a plural expression unless the context clearly indicates otherwise.

In the exemplary embodiment of the present disclosure, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present invention have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the present disclosure and their practical application, to enable others skilled in the art to make and utilize various exemplary embodiments of the present invention, as well as various alternatives and modifications thereof. It is intended that the scope of the present disclosure be defined by the Claims appended hereto and their equivalents.

What is claimed is:

1. A method of a first device, the method comprising:

performing, by a processor, a first backoff operation for a first data frame on a first link;

performing, by the processor, a second backoff operation for a second data frame on a second link;

transmitting, by the processor, the first data frame to a second device on the first link based on the first backoff operation; and transmitting, by the processor, the second data frame to the second device on the second link based on the second backoff operation, wherein a second transmission end time of the second data frame is aligned to a first transmission end time of the first data frame based on transmission delay of the second data frame, wherein the transmission of the second data frame is delayed for a first time period starting from a point at which a backoff counter of the second backoff operation reaches zero, and wherein the first time period is determined based on the first transmission end time.

2. The method of claim 1, further including:

receiving a first block ACK (BA) frame for the first data frame from the second device on the first link; and receiving a second BA frame for the second data frame from the second device on the second link, wherein the first BA frame and the second BA frame are received simultaneously.

3. The method of claim 1, further including: receiving a first BA frame for the first data frame and a second BA frame for the second data frame from the second device on one of the first link and the second link.

4. The method of claim 1, wherein the transmitting the second data frame to the second device comprises:

estimating a third transmission end time of the second data frame for a case where the second data frame is transmitted without delay;

performing a fragmentation operation for the second data frame based on the third transmission end time being later than the first transmission end time, wherein the second data frame is fragmented into a second data frame part #1 and a second data frame part #2 such that a fourth transmission end time of the second data frame part #1 is aligned with the first transmission end time, and wherein the second data frame part #1 is transmitted to the second device without delay based on the third transmission end time being later than the first transmission end time.

5. The method of claim 4, further including: transmitting the second data frame part #2 to the second device on the second link, without performing a backoff operation after transmission of the second data frame part #1.

6. The method of claim 4, wherein a transmit opportunity (TXOP) is configured on the second link to include a time required for transmission of the second data frame part #1, a time required for reception of a second BA frame for the second data frame part #1, a time required for transmission of the second data frame part #2, and a time required for reception of a third BA frame for the second data frame part #2, and wherein the time required for reception of the second BA frame for the second data frame part #1 is set to a time corresponding to a maximum length of a BA frame.

7. The method of claim 4, wherein the fragmentation operation for the second data frame is performed when the second device does not support a simultaneous transmit and receive (STR) operation.

8. The method of claim 4, wherein the fragmentation operation for the second data frame is performed when interference occurs between transmission on the first link and transmission on the second link.

9. The method of claim 1, wherein a first access category of the first data frame is different from a second access category of the second data frame.

10. The method of claim 1, wherein the transmitting the second data frame to the second device comprises:

estimating a third transmission end time of the second data frame based on a case where the second data frame is transmitted without delay; and delaying the second data frame based on the third transmission end time being earlier than the first transmission end time.

11. A first device comprising:

a processor; and a memory configured for storing one or more instructions executable by the processor, wherein the one or more instructions are executed to perform:

performing a first backoff operation for a first data frame on a first link;

performing a second backoff operation for a second data frame on a second link;

transmitting the first data frame to a second device on the first link based on the first backoff operation;

transmitting a second data frame to the second device on the second link based on the first backoff operation, wherein a second transmission end time of the second data frame is aligned with a first transmission end time of the first data frame based on transmission delay of the second data frame, and wherein the transmission of the second data frame is delayed for a first time period starting from a point at which a backoff counter of the second backoff operation reaches zero, and wherein the first time period is determined based on the first transmission end time.

12. The first device of claim 11, wherein the one or more instructions are further executed to perform:

receiving a first block ACK (BA) frame for the first data frame from the second device on the first link; and receiving a second BA frame for the second data frame from the second device on the second link, wherein the first BA frame and the second BA frame are received simultaneously.

13. The first device of claim 11, wherein the one or more instructions are further executed to perform: receiving a first BA frame for the first data frame and a second BA frame for the second data frame from the second device on one of the first link and the second link.

14. The first device of claim 11, wherein the one or more instructions are further executed to perform:

estimating a third transmission end time of the second data frame for a case where the second data frame is transmitted without delay;

performing a fragmentation operation for the second data frame based on the third transmission end time being later than the first transmission end time, wherein the second data frame is fragmented into a second data frame part #1 and a second data frame part #2 such that a fourth transmission end time of the second data frame part #1 is aligned with the first transmission end time, and wherein the second data frame part #1 is transmitted to the second device without delay based on the third transmission end time being later than the first transmission end time.

15. The first device of claim 14, wherein the one or more instructions are further executed to perform: transmitting the second data frame part #2 to the second device on the second link, without performing a backoff operation after transmission of the second data frame part #1.

16. The first device of claim 14, wherein a transmit opportunity (TXOP) is configured on the second link to include a time required for transmission of the second data frame part #1, a time required for reception of a second BA frame for the second data frame part #1, a time required for transmission of the second data frame part #2, and a time required for reception of a third BA frame for the second data frame part #2, and wherein the time required for reception of the second BA frame for the second data frame part #1 is set to a time corresponding to a maximum length of a BA frame.

17. The first device of claim 14, wherein the fragmentation operation for the second data frame is performed when the second device does not support a simultaneous transmit and receive (STR) operation.

18. The first device of claim 14, wherein the fragmentation operation for the second data frame is performed when interference occurs between transmission on the first link and transmission on the second link.

19. The method of claim 11, wherein a first access category of the first data frame is different from a second access category of the second data frame.

20. The first device of claim 11, wherein the one or more instructions are further executed to perform:

estimating a third transmission end time of the second data frame based on a case where the second data frame is transmitted without delay;

delaying the second data frame based on the third transmission end time being earlier than the first transmission end time.

* * * * *